(12) United States Patent
Sadakane et al.

(10) Patent No.: US 11,697,272 B2
(45) Date of Patent: Jul. 11, 2023

(54) LAMINATED GLASS

(71) Applicant: AGC Inc., Tokyo (JP)

(72) Inventors: Shunsuke Sadakane, Tokyo (JP); Shoichi Takeuchi, Tokyo (JP); Hideo Tsuboi, Tokyo (JP); Kazuhiko Niwano, Tokyo (JP); Nobutaka Kidera, Tokyo (JP); Ryota Okuda, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 17/746,630

(22) Filed: May 17, 2022

(65) Prior Publication Data

US 2022/0274380 A1 Sep. 1, 2022

Related U.S. Application Data

(63) Continuation of application No. PCT/JP2020/043068, filed on Nov. 18, 2020.

(30) Foreign Application Priority Data

Nov. 22, 2019 (JP) .................................. 2019-211080

(51) Int. Cl.
*B32B 17/10* (2006.01)
*B32B 7/025* (2019.01)
(Continued)

(52) U.S. Cl.
CPC ........ *B32B 17/10614* (2013.01); *B32B 7/025* (2019.01); *B32B 17/10036* (2013.01);
(Continued)

(58) Field of Classification Search
CPC ......... B32B 7/00–7/14; B32B 17/00–17/1099; B60J 1/00–1/2097
See application file for complete search history.

(56) References Cited

U.S. PATENT DOCUMENTS

2004/0234778 A1* 11/2004 Fukatani ........... B32B 17/10174
428/441
2011/0027515 A1 2/2011 Melcher et al.
(Continued)

FOREIGN PATENT DOCUMENTS

GB 2 271 139 A 4/1994
JP H05-330864 A 12/1993
(Continued)

OTHER PUBLICATIONS

International Searching Authority, "International Search Report," issued in connection with International Patent Application No. PCT/JP2020/043068, dated Feb. 9, 2021.
International Searching Authority, "Written Opinion," issued in connection with International Patent Application No. PCT/JP2020/043068, dated Feb. 9, 2021.

*Primary Examiner* — Prashant J Khatri
(74) *Attorney, Agent, or Firm* — Foley & Lardner LLP

(57) ABSTRACT

A laminated glass according to the present invention includes a first glass plate, a second glass plate, and an interlayer film. The interlayer film includes a laminated region including a first layer that is in contact with the first glass plate, a second layer that is in contact with the second glass plate, and a third layer disposed between the first layer and the second layer. When the relative dielectric constant of the first glass plate is denoted by $\varepsilon_{g1}$, the relative dielectric constant of the second glass plate is denoted by $\varepsilon_{g2}$, the relative dielectric constant of the first layer is denoted by $\varepsilon_{m1}$, the relative dielectric constant of the second layer is denoted by $\varepsilon_{m2}$, and the relative dielectric constant of the third layer is denoted by $\varepsilon_{m3}$, relationships $\varepsilon_{m1}<\varepsilon_{g1}$, $\varepsilon_{m1}<\varepsilon_{g2}$, $\varepsilon_{m2}<\varepsilon_{g1}$, $\varepsilon_{m2}<\varepsilon_{g2}$, $\varepsilon_{m3}>\varepsilon_{m1}$, $\varepsilon_{m3}>\varepsilon_{m2}$ are established.

20 Claims, 19 Drawing Sheets

(51) Int. Cl.
*B32B 27/20* (2006.01)
*B32B 27/30* (2006.01)
*B60J 1/00* (2006.01)

(52) U.S. Cl.
CPC ........ *B32B 17/10761* (2013.01); *B32B 27/20* (2013.01); *B32B 27/30* (2013.01); *B32B 2250/05* (2013.01); *B32B 2250/40* (2013.01); *B32B 2264/1023* (2020.08); *B32B 2305/30* (2013.01); *B32B 2307/204* (2013.01); *B32B 2307/732* (2013.01); *B32B 2315/08* (2013.01); *B32B 2329/06* (2013.01); *B32B 2605/006* (2013.01); *B32B 2605/08* (2013.01); *B60J 1/001* (2013.01)

(56) References Cited

U.S. PATENT DOCUMENTS

| | | |
|---|---|---|
| 2019/0061481 A1 | 2/2019 | Kagaya et al. |
| 2019/0061641 A1 | 2/2019 | Kikuchi et al. |

FOREIGN PATENT DOCUMENTS

| | | | |
|---|---|---|---|
| JP | 2011-502090 A | 1/2011 | |
| JP | 2019-214129 A | 12/2019 | |
| WO | WO-2017/188415 A1 | 11/2017 | |
| WO | WO-2019020235 A1 * | 1/2019 | ....... B32B 17/10174 |

* cited by examiner

|  | DIELECTRIC MATERIAL 1 | DIELECTRIC MATERIAL 2 | DIELECTRIC MATERIAL 3 | DIELECTRIC MATERIAL 4 | DIELECTRIC MATERIAL 5 |
|---|---|---|---|---|---|
| RATIO OF VOLUME OF PVB | 0.93 | 0.89 | 0.86 | 0.73 | 0.59 |
| RATIO OF VOLUME OF ALUMINA | 0.07 | 0.11 | 0.14 | 0.27 | 0.41 |
| RELATIVE DIELECTRIC CONSTANT | 3.24 | 3.51 | 3.7 | 4.7 | 5.7 |

※RELATIVE DIELECTRIC CONSTANT OF PVB IS 2.7 AND RELATIVE DIELECTRIC CONSTANT OF ALUMINA IS 10

Fig. 15

LAMINATED GLASS

INCORPORATION BY REFERENCE

This application is a continuation of PCT Application No. PCT/JP2020/043068, filed on Nov. 18, 2020, which is based upon and claims the benefit of priority from Japanese patent application No. 2019-211080, filed on Nov. 22, 2019, the disclosure of which is incorporated herein in its entirety by reference.

BACKGROUND

The present invention relates to a laminated glass, and in particular, to a laminated glass for a vehicle.

In recent years, besides communication in a wavelength range using microwaves or millimeter waves taking place, high-speed and large-capacity communication infrastructures such as 4G, LTE, and 5G have been expanding, and a frequency band being used has tended to expand from a band of 3 GHz to 5-80 GHz. When, for example, a millimeter wave radar mounted on a vehicle performs transmission and reception, an attenuation in the gain occurs due to window glass, which has not been noticeable in communications in previous frequency bands (e.g., up to 3 GHz), has become a problem.

As a technique for solving the aforementioned problem, International Patent Publication No. WO 2017/188415 discloses a configuration in which a part of a window glass, in particular, a laminated glass for vehicles, is replaced by a radio-wave transmitting material, which is fit into the laminated glass. That is, International Patent Publication No. WO 2017/188415 discloses a configuration in which a radio-wave transmitting material is provided at least in a part of the laminated glass from which an inner (interior) glass has been removed, the laminated glass including two glass plates and an interlayer film held between the two glass plates, in order to increase the transmittance of a millimeter wave radar through the window member.

Further, Published Japanese Translation of PCT International Publication for Patent Application, No. 2011-502090 discloses a glass pane capable of improving the sensitivity of detecting electromagnetic radiation. In the glass pane disclosed in Published Japanese Translation of PCT International Publication for Patent Application, No. 2011-502090, a hole is provided in a part of an inner pane of a composite glass pane (laminated glass), thereby increasing the sensitivity of detecting the electromagnetic radiation transmitted through this hole.

SUMMARY

However, if a part of glass is removed in order to increase the transmittance of a millimeter wave radar and a radio-wave transmitting material is provided in the part of the laminated glass from which the glass has been removed, like in regard to the window member disclosed in International Patent Publication No. WO 2017/188415, there is a problem that the manufacturing process becomes complicated.

Further, when a hole is provided in a part of the inner pane of the composite glass pane (laminated glass), like in Published Japanese Translation of PCT International Publication for Patent Application, No. 2011-502090, a part of the inner pane is removed, which causes a problem that the glass strength required for the composite glass pane (laminated glass) is decreased.

In view of the aforementioned problem, an object of the present invention is to provide a laminated glass that increases the radio wave transmittance in a millimeter wave band and satisfies the original strength of a laminated glass.

A laminated glass according to a first aspect of the present invention includes a first glass plate, a second glass plate, and an interlayer film held between the first glass plate and the second glass plate. The interlayer film includes, in a plan view of the first glass plate, a laminated region including a first layer that is in contact with the first glass plate, a second layer that is in contact with the second glass plate, and a third layer disposed between the first layer and the second layer. When a predetermined frequency in 60 to 100 GHz is expressed by F[GHz], the relative dielectric constant of the first glass plate in the frequency F is denoted by $\varepsilon_{g1}$, the relative dielectric constant of the second glass plate in the frequency F is denoted by $\varepsilon_{g2}$, the relative dielectric constant of the first layer in the frequency F is denoted by $\varepsilon_{m1}$, the relative dielectric constant of the second layer in the frequency F is denoted by $\varepsilon_{m2}$, and the relative dielectric constant of the third layer in the frequency F is denoted by $\varepsilon_{m3}$, relationships $$\varepsilon_{m1} < \varepsilon_{g1}, \varepsilon_{m1} < \varepsilon_{g2},$$

$$\varepsilon_{m2} < \varepsilon_{g1}, \varepsilon_{m2} < \varepsilon_{g2}, \text{ and}$$

$$\varepsilon_{m3} > \varepsilon_{m1}, \varepsilon_{m3} > \varepsilon_{m2}$$

are established.

In the laminated glass in the first aspect, the $\varepsilon_{g1}$, the $\varepsilon_{g2}$, and the $\varepsilon_{m3}$ may have relationships $\varepsilon_{m3} < \varepsilon_{g1}$ and $\varepsilon_{m3} < \varepsilon_{g2}$.

In the laminated glass in the first aspect, the $\varepsilon_{m1}$, the $\varepsilon_{m2}$, and the $\varepsilon_{m3}$ may satisfy $\varepsilon_{m3}/\varepsilon_{m1} \geq 1.2$ and $\varepsilon_{m3}/\varepsilon_{m2} \geq 1.2$.

In the laminated glass in the first aspect, when the thickness of the interlayer film is denoted by T and the thickness of the third layer is denoted by $T_{m3}$, $T_{m3}/T \geq 0.1$ may be satisfied.

In the laminated glass in the first aspect, the $\varepsilon_{m1}$, the $\varepsilon_{m2}$, and the $\varepsilon_{m3}$ may satisfy $\varepsilon_{m3}/\varepsilon_{m1} \geq 1.37$ and $\varepsilon_{m3}/\varepsilon_{m2} \geq 1.37$.

In the laminated glass in the first aspect, the $\varepsilon_{m1}$, the $\varepsilon_{m2}$, and the $\varepsilon_{m3}$ may satisfy $2.11 \geq \varepsilon_{m3}/\varepsilon_{m1}$ and $2.11 \geq \varepsilon_{m3}/\varepsilon_{m2}$.

In the laminated glass in the first aspect, when the thickness of the interlayer film is denoted by T and the thickness of the third layer is denoted by $T_{m3}$, $0.39 \leq T_{m3}/T < 1$ may be satisfied.

A laminated glass according to a second aspect of the present invention includes a first glass plate, a second glass plate, and an interlayer film held between the first glass plate and the second glass plate. The interlayer film includes, in a plan view of the first glass plate, a laminated region including a first layer that is in contact with the first glass plate, a second layer that is in contact with the second glass plate, and a third layer disposed between the first layer and the second layer. When a predetermined frequency in 60 to 100 GHz is expressed by F[GHz], the relative dielectric constant of the first layer in the frequency F is denoted by $\varepsilon_{m1}$, the relative dielectric constant of the second layer in the frequency F is denoted by $\varepsilon_{m2}$, and the relative dielectric constant of the third layer in the frequency F is denoted by $\varepsilon_{m3}$, relationships $$\varepsilon_{m1} > \varepsilon_{m3} \text{ and}$$

$$\varepsilon_{m2} > \varepsilon_{m3}$$

are established, and when the thickness of the interlayer film in the laminated region is denoted by T, the thickness of the first layer in the laminated region is denoted by $T_{m1}$, and the thickness of the second layer in the laminated region is denoted by $T_{m2}$, a relationship $$(T_{m1}+T_{m2})/T \geq 0.5$$

is established.

In the laminated glass according to the second aspect, when the relative dielectric constant of the first glass plate in the frequency F is denoted by $\varepsilon_{g1}$ and the relative dielectric constant of the second glass plate is denoted by $\varepsilon_g g$, the $\varepsilon_{g1}$, the $\varepsilon_g g$, the $\varepsilon_{m1}$, and the $\varepsilon_{m2}$ may have relationships $$\varepsilon_{m1} < \varepsilon_{g1}, \varepsilon_{m1} < \varepsilon_{g2} \text{ and}$$

$$\varepsilon_{m2} < \varepsilon_{g1}, \varepsilon_{m2} < \varepsilon_{g2}$$

In the laminated glass according to the second aspect, the $\varepsilon_{m1}$, the $\varepsilon_{m2}$, and the $\varepsilon_{m3}$ may satisfy $\varepsilon_{m1}/\varepsilon_{m3} \geq 1.2$ and $\varepsilon_{m2}/\varepsilon_{m3} \geq 1.2$.

In the laminated glass according to the second aspect, the $\varepsilon_{m1}$, the $\varepsilon_{m2}$, and the $\varepsilon_{m3}$ may satisfy $\varepsilon_{m1}/\varepsilon_{m3} \geq 1.37$ and $\varepsilon_{m2}/\varepsilon_{m3} \geq 1.37$.

In the laminated glass according to the second aspect, the $\varepsilon_{m1}$, the $\varepsilon_{m2}$, and the $\varepsilon_{m3}$ may satisfy $2.11 \geq \varepsilon_{m1}/\varepsilon_{m3}$ and $2.11 \geq \varepsilon_{m2}/\varepsilon_{m3}$.

In the laminated glass according to the second aspect, the thickness T of the interlayer film, the thickness $T_{m1}$ of the first layer, and the thickness $T_{m2}$ of the second layer may satisfy $0.66 \leq (T_{m1}+T_{m2})/T < 1$.

A laminated glass according to a third aspect of the present invention includes a first glass plate, a second glass plate, and an interlayer film held between the first glass plate and the second glass plate. The interlayer film includes, in a plan view of the first glass plate, a laminated region including a first layer that is in contact with the first glass plate and a second layer that is in contact with the second glass plate. When a predetermined frequency in 60 to 100 GHz is expressed by F[GHz], and the relative dielectric constant of the first glass plate in the frequency F is denoted by $\varepsilon_{g1}$, the relative dielectric constant of the second glass plate in the frequency F is denoted by $\varepsilon_{g2}$, the relative dielectric constant of one of the first layer and the second layer that has a relatively higher dielectric constant is denoted by $\varepsilon_{mH}$, and the relative dielectric constant of the other one of the first layer and the second layer that has a relatively lower dielectric constant is denoted by $\varepsilon_{mL}$, relationships $$\varepsilon_{mH} < \varepsilon_{g1}, \varepsilon_{mH} < \varepsilon_{g2} \text{ and}$$

$$\varepsilon_{mL} < \varepsilon_{g1}, \varepsilon_{mL} < \varepsilon_{g2}$$

are established, and when the thickness of the interlayer film in the laminated region is denoted by T, and the thickness of one of the first layer and the second layer that has a relatively higher dielectric constant is denoted by $T_{mH}$, a relationship $$T_{mH}/T \geq 0.3$$

is established.

In the laminated glass in the third aspect, the $\varepsilon_{mH}$ and the $\varepsilon_{mL}$ may satisfy $\varepsilon_{mH}/\varepsilon_{mL} \geq 1.2$.

In the laminated glass in the third aspect, the $\varepsilon_{mH}$ and the $\varepsilon_{mL}$ may satisfy $\varepsilon_{mH}/\varepsilon_{mL} \geq 1.37$.

In the laminated glass in the third aspect, the T and the $T_{mH}$ may satisfy $0.66 \leq T_{mH}/T < 1$.

In the above laminated glass, the interlayer film may include, in a plan view of the first glass plate, a first region, which is the laminated region, and a second region where the interlayer film is formed of only at least one of the first layer and the second layer.

In the above laminated glass, the frequency F may be 79 GHz.

In the above laminated glass, one of the layers that compose the interlayer film that has a high relative dielectric constant may be formed by mixing a filler having a high dielectric constant with a resin material.

According to the present invention, it is possible to provide a laminated glass that increases the radio wave transmittance in a millimeter wave band and satisfies the original strength of the laminated glass.

BRIEF DESCRIPTION OF DRAWINGS

FIG. 15 is a table for describing one example of dielectric materials made of PVB and alumina;

DESCRIPTION OF EMBODIMENTS

Hereinafter, with reference to the drawings, embodiments of the present invention will be described.

Figure 1:
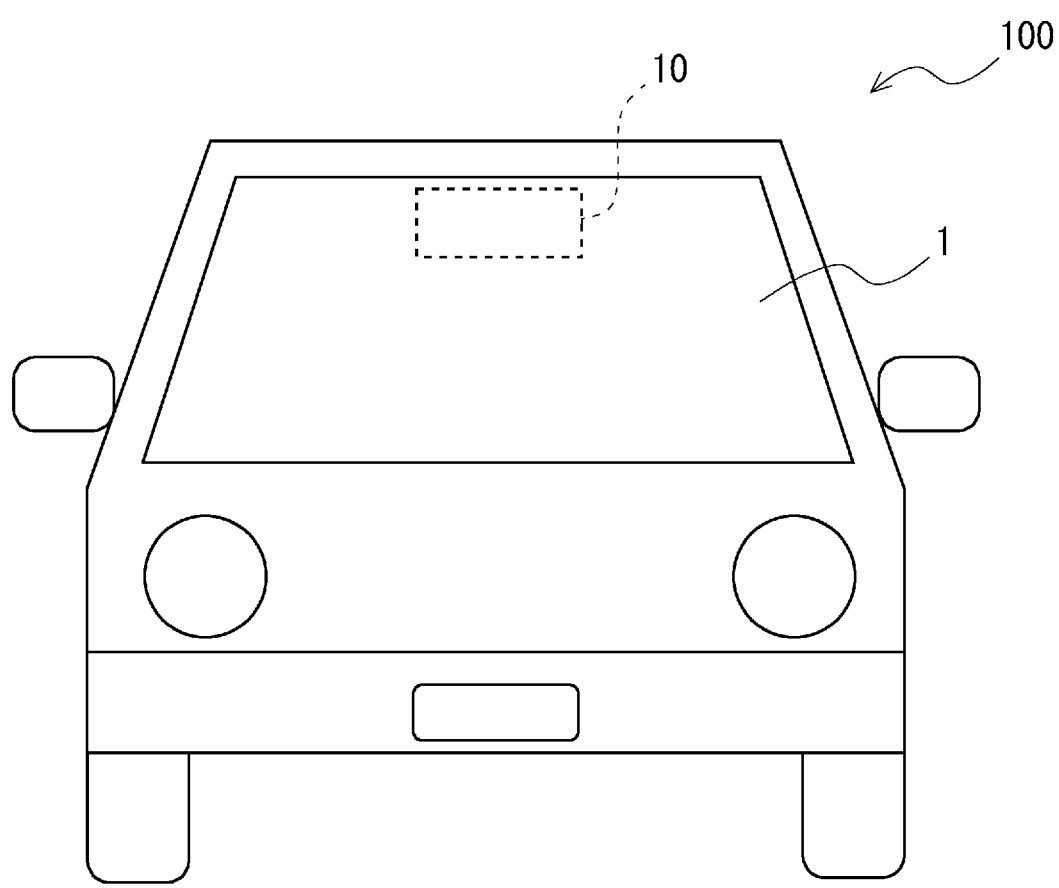
FIG. 1 is a diagram showing a vehicle including a laminated glass according to the present invention.

FIG. 1 is a diagram showing a vehicle including a laminated glass according to the present invention. As shown in FIG. 1, a laminated glass 1 according to the present invention is typically used for a windshield of a vehicle 100 such as an automobile. However, the laminated glass 1 according to the present invention is not limited to the windshield of the vehicle 100 and may be a rear glass attached to a rear part of the vehicle 100, a side glass attached to a side part of the vehicle 100, and a roof glass attached to the ceiling of the vehicle 100.

The vehicle 100 includes an information device for ensuring traveling safety of the vehicle 100. This information device is equipped in, for example, a housing (case) 10 provided in the laminated glass (windshield) 1 on the inner side of the vehicle. While the housing (case) 10 is provided in the upper center of the laminated glass in FIG. 1, it may be disposed in another part.

The information device, which is a device for detecting a vehicle, a pedestrian, an obstacle, etc. in front of a vehicle using a millimeter wave radar, may include, for example, besides the millimeter wave radar, a stereo camera, an infrared laser, etc. Further, the information device may include a communication device capable of achieving high-speed and large-capacity communications such as 4G, LTE, or 5G. For example, an antenna for communication may be stored in the housing (case) 10.

In the present invention, the information device is configured to be able to transmit and/or receive radio waves (signals) in a millimeter wave band. Therefore, in the present invention, the radio wave transmittance in the millimeter wave band can be increased at least in a part of the laminated glass 1 that corresponds to where the housing (case) 10 is provided. In the present invention, the millimeter wave band indicates 30 to 300 GHz, and the effect of the present invention is particularly remarkable in 60 to 100 GHz.

Figure 2:
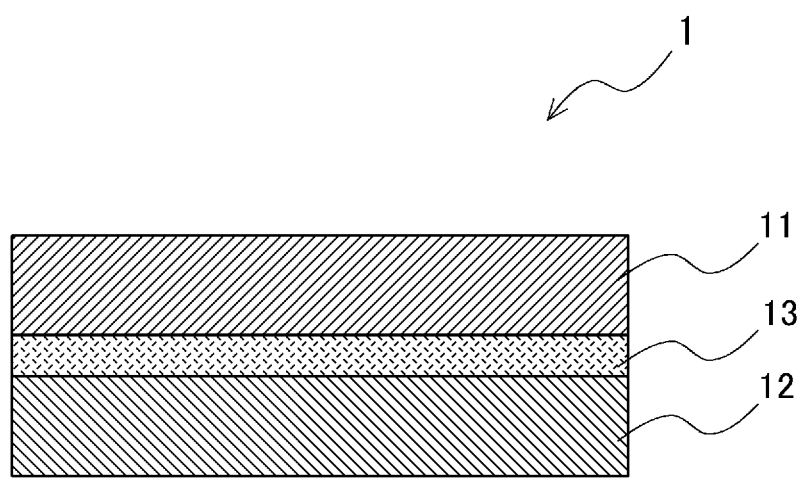
FIG. 2 is a cross-sectional view of the laminated glass according to the present invention.

FIG. 2 is a cross-sectional view of the laminated glass according to the present invention. As shown in FIG. 2, the laminated glass 1 according to the present invention includes a first glass plate 11, a second glass plate 12, and an interlayer film 13 held between the first glass plate 11 and the second glass plate 12. That is, the first glass plate 11 and the second glass plate 12 are bonded to each other via the interlayer film 13.

While the first glass plate 11 and the second glass plate 12 are manufactured using, for example, a float process or a fusion process, the method is not particularly limited. Further, the laminated glass 1 can be manufactured by, but not limited thereto, laminating the first glass plate 11, the interlayer film 13, and the second glass plate 12 in this order, vacuuming them using a vacuum packaging apparatus, and performing a thermocompression bonding process using an autoclave.

At least one of the first glass plate 11 and the second glass plate 12 may be, for example, soda-lime glass, aluminosilicate glass, borosilicate glass, non-alkaline glass, or silica glass. Each of the first glass plate 11 and the second glass plate 12 may be either of non-tempered glass or tempered glass. The non-tempered glass is obtained by forming molten glass into a plate and then slowly cooling down this plate. The tempered glass is glass having a compression stress layer formed on the surface of the non-tempered glass plate. Further, at least one of the first glass plate 11 and the second glass plate 12 may be a glass plate that absorbs ultra-violet rays or infrared rays, or may be a colored glass plate.

The tempered glass may be, for example, either of a physically tempered glass such as air quenching tempered glass, or chemically tempered glass. The physically tempered glass may be tempered by quenching a uniformly heated glass plate during bending from a temperature close to its softening point or using treatment other than annealing to produce a compressive stress layer on the glass plate surface by its temperature difference between the glass plate surface and the inside of the glass. The chemically tempered glass may be tempered by producing compressive stress on the glass plate surface by an ion exchange method or the like after bending.

Examples of the composition of at least one of the first glass plate 11 and the second glass plate 12 used in the present invention include, as represented by molar percentage based on oxides, glass that satisfies the following relationship. The glass composition includes, for example, but not limited thereto, glass containing 50 to 80% of $SiO_2$, 0 to 10% of $B_2O_3$, 0.1 to 25% of $Al_2O_3$, 3 to 30% in total of at least one type of alkali metal oxide selected from the group consisting of $Li_2O$, $Na_2O$, and $K_2O$, 0 to 25% of MgO, 0 to 25% of CaO, 0 to 5% of SrO, 0 to 5% of BaO, 0 to 5% of $ZrO_2$, and 0 to 5% of $SnO_2$.

Other examples of the composition of at least one of the first glass plate 11 and the second glass plate 12 used in the present invention may include, as represented by molar percentage based on oxides, glass that satisfies the following relationships.

$50 \leq SiO_2 \leq 85$ $0 \leq Al_2O_3 \leq 20$ $4 \leq R_2O \leq 22$ ($R_2O$ denotes the total amount of alkali metal oxide)

$0 \leq RO \leq 20$ (RO denotes the total amount of MgO, CaO, SrO, and BaO)

$0 \leq Na_2O/R_2O \leq 0.8$ $0 \leq K_2O/R_2O \leq 0.7$

Other examples of the composition of at least one of the first glass plate 11 and the second glass plate 12 used in the present invention may include, as represented by molar percentage based on oxides, glass that satisfies the following relationships.

$72 \leq SiO_2 + Al_2O_3 + B_2O_3 \leq 98$ $55 \leq SiO_2 \leq 87$ $0 \leq Al_2O_3 \leq 20$ $0 \leq B_2O_3 \leq 25$ $0 \leq R_2O \leq 5$ ($R_2O$ denotes the total amount of alkali metal oxide)

$0 \leq RO \leq 20$ (RO denotes the total amount of MgO, CaO, SrO, and BaO)

The interlayer film 13 may be polyvinyl butyral (PVB), ethylene vinyl acetate (EVA), cycloolefin polymer, urethane resin, polyvinylidene fluoride resin (PVDF) or the like, and may contain at least one type selected from the group consisting thereof. Alternatively, a thermosetting resin which is in a liquid state before heating may be used. That is, the interlayer film 13 may be layered in a state of the laminated glass 1, and the interlayer film 13 may be, for example, in a liquid state before the first glass plate 11 and the second glass plate 12 are bonded. Note that the details of the interlayer film 13 will be described later.

In the following first to third embodiments, a specific configuration of the laminated glass 1 and results of simulations of the present invention will be described in detail.

First Embodiment

Figure 3:
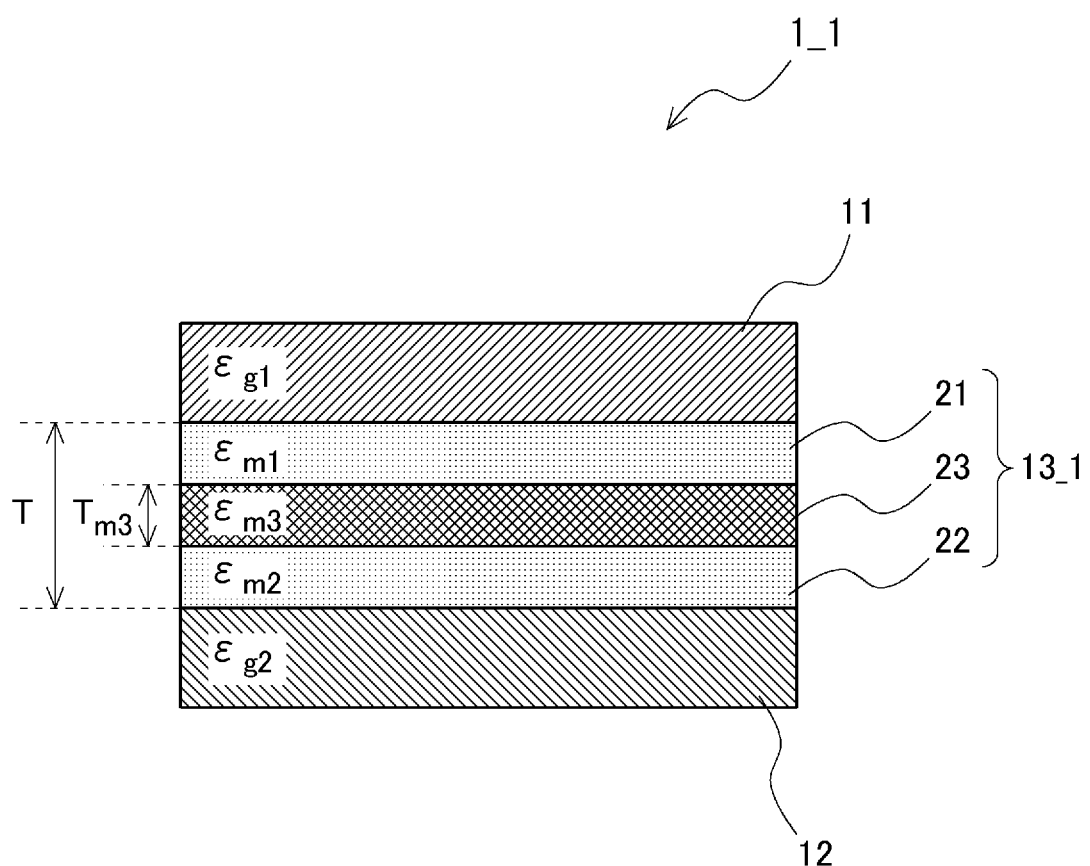
FIG. 3 is a cross-sectional view of a laminated glass according to a first embodiment.

FIG. 3 is a cross-sectional view of a laminated glass according to a first embodiment. As shown in FIG. 3, a laminated glass 1_1 according to the first embodiment includes a first glass plate 11, a second glass plate 12, and an interlayer film 13_1 held between the first glass plate 11 and the second glass plate 12. The interlayer film 13_1 includes, in a plan view of the first glass plate 11, a laminated region including a first layer 21 that is in contact with the first glass plate 11, a second layer 22 that is in contact with the second glass plate 12, and a third layer 23 disposed between the first layer 21 and the second layer 22. That is, the interlayer film 13_1 may be formed of a laminated structure of three layers including the first layer 21, the third layer 23, and the second layer 22. The plan view here means a case in which the laminated glass 1_1 is seen from the plate thickness direction.

Further, in this embodiment, the interlayer film 13_1 may include a laminated region at least in a part of the laminated glass 1_1 that corresponds to the housing 10 (see FIG. 1) where the information device is stored. Specifically, it is sufficient that the laminated glass 1_1 include the interlayer film 13_1 having a configuration according to this embodiment in a part (first region) of the laminated glass 1_1 corresponding to the housing 10 (see FIG. 1) where the millimeter wave radar travels through the window glass 1, and the interlayer film in another region (second region) may be formed in a desired manner. For example, the interlayer film in the other region (second region) may be composed of only at least one of the first layer 21 and the second layer 22 so as to have a thickness the same as that of the interlayer film 13_1.

Further, in this embodiment, the entire laminated glass (windshield) 1 shown in FIG. 1 may include the laminated glass 1_1 having a configuration as shown in FIG. 3. That is, in this embodiment, the entire laminated glass (windshield) 1 shown in FIG. 1 may include the interlayer film 13_1 (see FIG. 3) including a laminated region.

The laminated glass 1_1 according to this embodiment has the following relationship when the relative dielectric constant of the first glass plate 11 in a predetermined frequency F is denoted by $\varepsilon_{g1}$, the relative dielectric constant of the second glass plate 12 in the predetermined frequency F is denoted by $\varepsilon_{g2}$, the relative dielectric constant of the first layer 21 of the interlayer film 13_1 in the predetermined frequency F is denoted by $\varepsilon_{m1}$, the relative dielectric constant of the second layer 22 in the predetermined frequency F is denoted by $\varepsilon_{m2}$, and the relative dielectric constant of the third layer 23 in the predetermined frequency F is denoted by $\varepsilon_{m3}$. The predetermined frequency F is 60 to 100 GHz, and more specifically, 79 GHz. In the following description, each of the relative dielectric constants will be described as a value in 79 GHz unless otherwise specified.

That is, the laminated glass 1_1 has relationships of $\varepsilon_{m1} < \varepsilon_{g1}, \varepsilon_{m1} < \varepsilon_{g2},$ $\varepsilon_{m2} < \varepsilon_{g1}, \varepsilon_{m2} < \varepsilon_{g2},$ and $\varepsilon_{m3} > \varepsilon_{m1}, \varepsilon_{m3} > \varepsilon_{m2}.$ Specifically, the relative dielectric constants $\varepsilon_{m1}$ and $\varepsilon_{m2}$ of the first layer 21 and the second layer 22 of the interlayer film 13_1 are respectively lower than the relative dielectric constants $\varepsilon_{g1}$ and $\varepsilon_{g2}$ of the first glass plate 11 and the second glass plate 12. Further, the relative dielectric constant $\varepsilon_{m3}$ of the third layer 23 held between the first layer 21 and the second layer 22 of the interlayer film 13_1 is higher than the relative dielectric constants $\varepsilon_{m1}$ and $\varepsilon_{m2}$ of the first layer 21 and the second layer 22.

In this embodiment, relative dielectric constants of the respective elements that compose the laminated glass 1_1 have the aforementioned relationships, whereby the three layers that compose the interlayer film 13_1 can be regarded as a composite material system, and the difference between the relative dielectric constant of the interlayer film 13_1 and the relative dielectric constants of the first glass plate 11 and the second glass plate 12 can be made small from a macroscopic viewpoint, allowing the radio wave transmittance in the millimeter wave band to be increased. Further, in this embodiment, there is no need to remove a part of the elements that compose the laminated glass 1_1, whereby the original strength of a laminated glass may be satisfied. That is, the laminated glass 1_1 according to this embodiment has a three-layer structure including the first glass plate 11, the second glass plate 12, and the interlayer film 13_1, whereby the original strength of the laminated glass may be satisfied.

Further, the thickness of each of the first glass plate 11 and the second glass plate 12 may be 1.1 mm or larger, preferably 1.5 mm or larger, and more preferably 1.8 mm or larger in order to secure a sufficient level of strength. Further, it is desirable that the upper limit of the thickness of each of the first glass plate 11 and the second glass plate 12 be generally 3.0 mm or smaller since the thicker it is, the heavier it becomes, although the upper limit is not particularly limited.

In the laminated glass 1_1 according to this embodiment, the relative dielectric constant $\varepsilon_{g1}$ of the first glass plate 11, the relative dielectric constant $\varepsilon_{g2}$ of the second glass plate 12, and the relative dielectric constant $\varepsilon_{m3}$ of the third layer 23 of the interlayer film 13_1 may have relationships $\varepsilon_{m3} < \varepsilon_{g1}$ and $\varepsilon_{m3} < \varepsilon_{g2}$. That is, the relative dielectric constant $\varepsilon_{m3}$ of the third layer 23 of the interlayer film 13_1 may be lower than the relative dielectric constants $\varepsilon_{g1}$ and $\varepsilon_{g2}$ of the first glass plate 11 and the second glass plate 12. If they have the aforementioned relationships, the three layers that compose the interlayer film 13_1 can be regarded as a composite material system, and the difference between the relative dielectric constant of the interlayer film 13_1 and the relative dielectric constants of the first glass plate 11 and the second glass plate 12 can be made small from a macroscopic viewpoint, whereby the radio wave transmittance in the millimeter wave band of the laminated glass 1_1 may be increased.

Further, in the laminated glass 1_1 according to this embodiment, the relative dielectric constant $\varepsilon_{m1}$ of the first layer 21 of the interlayer film 13_1, the relative dielectric constant $\varepsilon_{m2}$ of the second layer 22 of the interlayer film 13_1, and the relative dielectric constant $\varepsilon_{m3}$ of the third layer 23 of the interlayer film 13_1 may satisfy $\varepsilon_{m3}/\varepsilon_{m1} > 1.2$ and $\varepsilon_{m3}/\varepsilon_{m2} \geq 1.2$. Accordingly, the radio wave transmittance in the millimeter wave band of the laminated glass 1_1 may be improved by 0.5 dB or more.

Further, $\varepsilon_{m3}/\varepsilon_{m1} \geq 1.3$ and $\varepsilon_{m3}/\varepsilon_{m2} \geq 1.3$ may be satisfied, $\varepsilon_{m3}/\varepsilon_{m1} \geq 1.37$ and $\varepsilon_{m3}/\varepsilon_{m2} \geq 1.37$ may be satisfied, $\varepsilon_{m3}/\varepsilon_{m1} \geq 1.74$ and $\varepsilon_{m3}/\varepsilon_{m2} \geq 1.74$ may be satisfied, or $\varepsilon_{m3}/\varepsilon_{m1} \geq 2.11$ and $\varepsilon_{m3}/\varepsilon_{m2} \geq 2.11$ may be satisfied.

In this description, the relative dielectric constant $\varepsilon_{m3}$ of the third layer 23 with respect to the relative dielectric constant $\varepsilon_{m1}$ of the first layer 21 is expressed by a "dielectric constant ratio: $\varepsilon_{m3}/\varepsilon_{m1}$". Likewise, the relative dielectric constant $\varepsilon_{m3}$ of the third layer 23 with respect to the relative dielectric constant $\varepsilon_{m2}$ of the second layer 22 is expressed by a "dielectric constant ratio: $\varepsilon_{m3}/\varepsilon_{m2}$". Further, when the relative dielectric constant $\varepsilon_{m1}$ of the first layer 21 is the same as the relative dielectric constant $\varepsilon_{m2}$ of the second layer 22, the "dielectric constant ratio: $\varepsilon_{m3}/\varepsilon_{m1}$" and the "dielectric constant ratio: $\varepsilon_{m3}/\varepsilon_{m2}$" are collectively expressed by a "dielectric constant ratio: $\varepsilon_{m3}/\varepsilon_{m1,2}$".

When the thickness of the interlayer film 13_1 is denoted by T and the thickness of the third layer 23 is denoted by $T_{m3}$, the laminated glass 1_1 according to this embodiment may further satisfy $T_{m3}/T \geq 0.1$. Further, $T_{m3}/T \geq 0.13$ may be satisfied, $T_{m3}/T \geq 0.39$ may be satisfied, $T_{m3}/T \geq 0.66$ may be satisfied, or $T_{m3}/T \geq 0.87$ may be satisfied. While the interlayer film 13_1 satisfies $T_{m3}/T < 1$ since the interlayer film 13_1 includes the first layer 21, the second layer 22, and the third layer 23, it may satisfy $T_{m3}/T \leq 0.95$ or $T_{m3}/T < 0.90$. If they have the aforementioned relationships, the radio wave transmittance in the millimeter wave band of the laminated glass 1_1 may be increased.

The thickness T of the interlayer film 13_1 is preferably 0.3 mm or larger, more preferably 0.5 mm or larger, and further preferably 0.7 mm or larger in terms of handling. Further, the thickness T of the interlayer film 13_1 is preferably 2.3 mm or smaller, more preferably 2.0 mm or smaller, and further preferably 1.0 mm or smaller in order to reduce the weight thereof. Further, the thickness of the interlayer film 13_2 and the thickness of the interlayer film 13_3 that will be explained later may be set in the above range.

(Results of Simulations)

Figure 4:
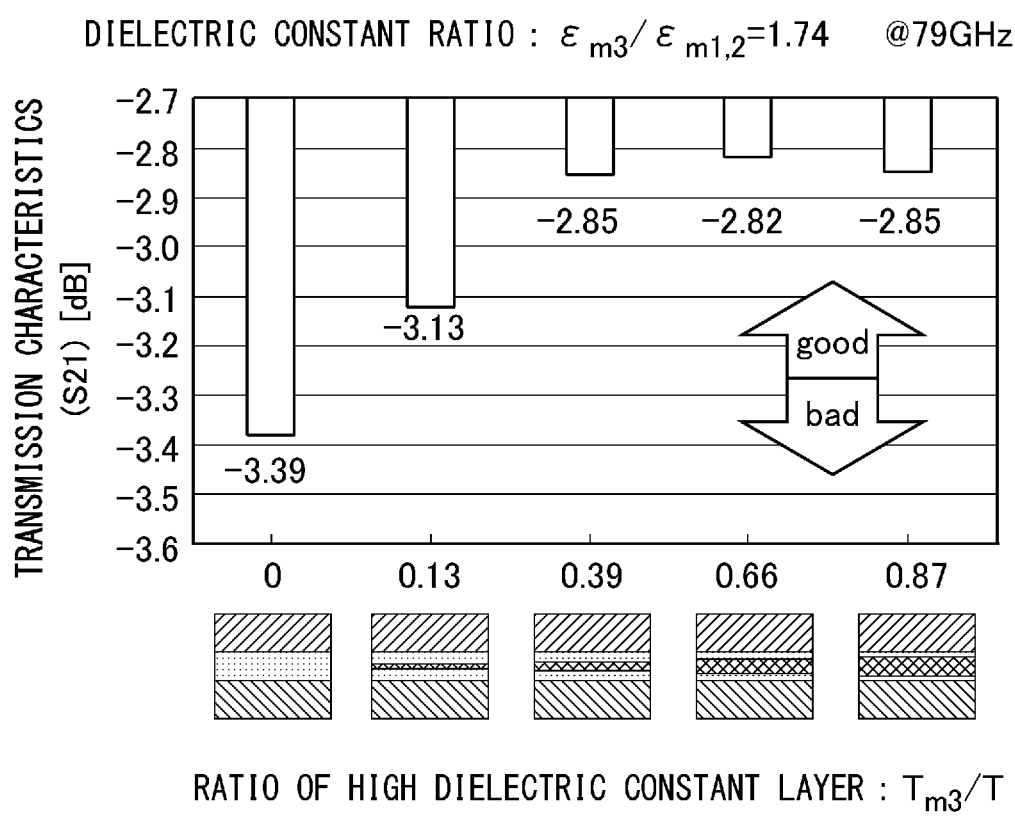
FIG. 4 shows results of a simulation indicating a relationship between a ratio of a high dielectric constant layer in an interlayer film and radio transmission characteristics in the laminated glass according to the first embodiment.

Next, results of simulations of the laminated glass 1_1 according to this embodiment will be explained. FIG. 4, which is a graph showing results of simulating the laminated glass according to this embodiment, shows a relationship between the ratio of the third layer 23 (high dielectric constant layer) in the interlayer film 13_1 (see FIG. 3) and the radio transmission characteristics. The "high dielectric constant layer" here indicates one of the three layers that compose the interlayer film 13_1 that has the relatively highest dielectric constant, that is, the third layer 23.

The conditions of the simulation shown in FIG. 4 are as follows.

The dielectric constant ratio of the interlayer film 13_1 (see FIG. 3) was $\varepsilon_{m3}/\varepsilon_{m1,2}=1.74$. Specifically, the relative dielectric constant $\varepsilon_{m1}$ of the first layer 21 of the interlayer film 13_1 was 2.7, the relative dielectric constant $\varepsilon_{m2}$ of the second layer 22 was 2.7, and the relative dielectric constant $\varepsilon_{m3}$ of the third layer 23 was 4.7. Further, the relative dielectric constant $\varepsilon_{g1}$ of the first glass plate 11 was 7 and the relative dielectric constant $\varepsilon_{g2}$ of the second glass plate 12 was 7. Each of the relative dielectric constants is a relative dielectric constant at the frequency F of 79 GHz. It was assumed that the first glass plate 11 and the second glass plate 12 were, as represented by molar percentage based on oxides, glass consisting of $SiO_2$: 69.7%, $Al_2O_3$: 0.9%, MgO: 7%, CaO: 9%, $TiO_2$: 0.05%, $Na_2O$: 12.6%, $K_2O$: 0.6%, and $Fe_2O_3$: 0.2%. It was further assumed that the first layer 21 and the second layer 22 were made of polyvinyl butyral (PVB).

The thickness of each of the first glass plate 11 and the second glass plate 12 was 2 mm. The thickness T of the interlayer film 13_1 was constant, namely, 0.76 mm. The thickness $T_{m3}$ of the third layer 23 (high dielectric constant layer) was 0 mm (related example), 0.1 mm, 0.3 mm, 0.5 mm, and 0.66 mm. Except for the case in which the third layer 23 is 0 mm, the thickness of the first layer 21 was the same as that of the second layer 22. The ratio ($T_{m3}/T$) of the third layer 23 (the high dielectric constant layer) in this case was 0, 0.13, 0.39, 0.66, and 0.87. The frequency in the simulation was 79 GHz. Further, the incident angle of the radio waves at 79 GHz was 67.5 degrees with respect to the main surface of the laminated glass 1_1. FIG. 4 shows results of simulating radio transmission characteristics (S21) under the above conditions.

As shown in FIG. 4, when the ratio ($T_{m3}/T$) of the third layer 23 (the high dielectric constant layer) was 0, that is, in the related example, the radio transmission characteristic of the millimeter wave band was low. On the other hand, as $T_{m3}/T$ was increased from 0, the radio transmission characteristic of the millimeter wave band was improved, and when $T_{m3}/T=0.66$, the radio transmission characteristic of the millimeter wave band was the best. After that, when $T_{m3}/T$ has increased, the radio transmission characteristic of the millimeter wave band showed good values although they were slightly decreased. Therefore, it can be said from the results of the simulation shown in FIG. 4 that, the radio transmission characteristics of the millimeter wave band were good when $T_{m3}/T$ was 0.13 or larger, preferably 0.39 or larger. In other words, by providing the third layer 23 having a high dielectric constant between the first layer 21 and the second layer 22, the radio transmission characteristics of the millimeter wave band in the laminated glass are improved.

Figure 5:
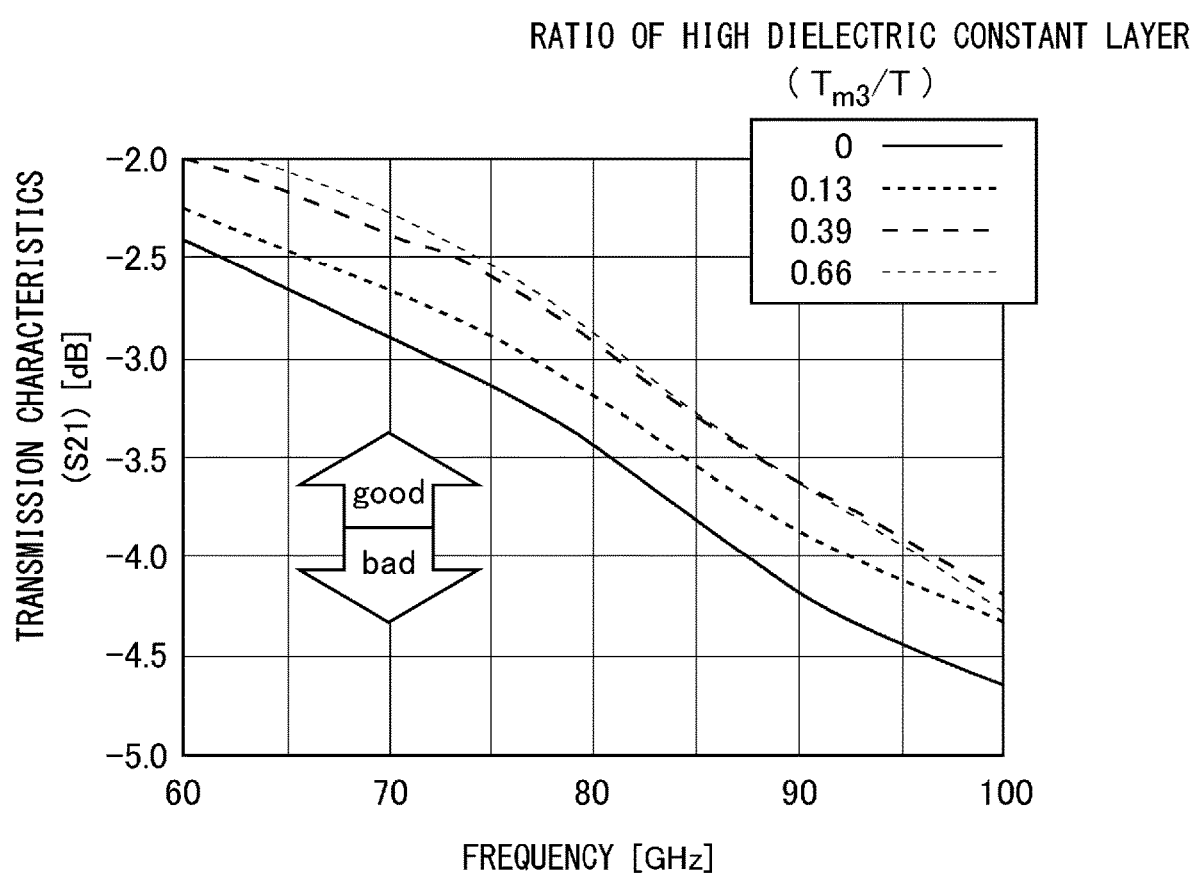
FIG. 5 shows results of a simulation indicating radio transmission characteristics in a predetermined frequency band of the laminated glass according to the first embodiment.

Next, results of a simulation shown in FIG. 5 will be explained. FIG. 5 shows results of a simulation indicating the radio transmission characteristics (S21) in a predetermined frequency band of the laminated glass. The conditions of the simulation shown in FIG. 5 were basically the same as the conditions of the simulation shown in FIG. 4, and the incident angle of the radio waves was 67.5 degrees with respect to the main surface of the laminated glass 1_1. FIG. 5 shows, unlike the conditions of the simulation shown in FIG. 4, the frequency of radio waves that are made incident on the laminated glass 1_1 in a range from 60 to 100 GHz.

As shown in the results of the simulation shown in FIG. 5, as the frequency is changed from 60 to 100 GHz, the radio transmission characteristics of the millimeter wave band were decreased. That is, it can be said from these results that as the frequency of the radio waves in the millimeter wave band that are made incident on the laminated glass 1_1 becomes higher, the radio transmission characteristics of the millimeter wave band are decreased.

Further, when the ratio ($T_{m3}/T$) of the third layer 23 (the high dielectric constant layer) is focused on, when $T_{m3}/T$ was 0.13 or larger, the radio transmission characteristics of the millimeter wave band have been improved in the frequency band from 60 to 100 GHz. In other words, when $T_{m3}/T$ was 0.13 or larger, the radio transmission characteristics of the millimeter wave band have been improved in the frequency band from 60 to 100 GHz compared to the related case in which $T_{m3}/T$ was 0. It can therefore be said that by providing the third layer 23 having a high dielectric constant between the first layer 21 and the second layer 22, radio transmission characteristics of millimeter waves of the laminated glass from 60 to 100 GHz are improved.

Figure 6:
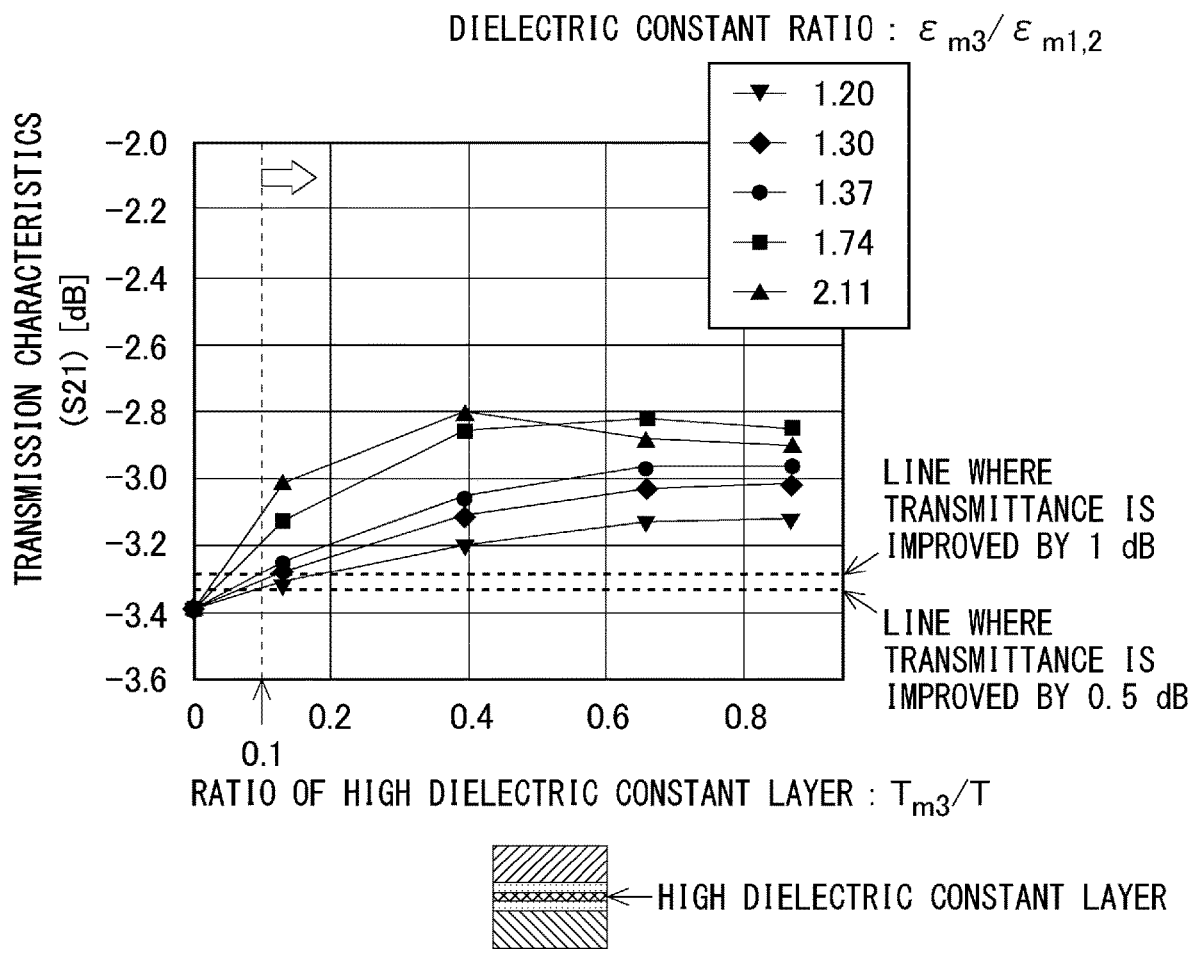
FIG. 6 shows results of a simulation indicating a relationship between a ratio of the high dielectric constant layer in the interlayer film and the radio transmission characteristics in the laminated glass according to the first embodiment.

Next, results of a simulation shown in FIG. 6 will be explained. FIG. 6, which is a graph showing results of simulating the laminated glass according to this embodiment, shows results of the simulation indicating a relationship between the ratio of the third layer 23 (high dielectric constant layer) in the interlayer film 13_1 (see FIG. 3) and the radio transmission characteristics (S21). While FIG. 4 shows the results of the simulation when the dielectric constant ratio ($\varepsilon_{m3}/\varepsilon_{m1,2}$) of the interlayer film 13_1 was 1.74, FIG. 6 collectively shows results of the simulation when the dielectric constant ratio ($\varepsilon_{m3}/\varepsilon_{m1,2}$) was 1.20, 1.30, 1.37, 1.74, and 2.11.

In the conditions of the simulation shown in FIG. 6, the relative dielectric constant $\varepsilon_{m1}$ of the first layer 21 of the interlayer film 13_1 and the relative dielectric constant $\varepsilon_{m2}$ of the second layer 22 of the interlayer film 13_1 were each fixed to 2.7, and the relative dielectric constant $\varepsilon_{m3}$ of the third layer 23 of the interlayer film 13_1 was 3.24, 3.51, 3.7, 4.7, and 5.7. That is, the conditions of the dielectric constant ratio ($\varepsilon_{m3}/\varepsilon_{m1,2}$) were 1.20, 1.30, 1.37, 1.74, and 2.11. The other conditions of the simulation are similar to the conditions of the simulation shown in FIG. 4.

As shown in FIG. 6, in the related case in which the ratio ($T_{m3}/T$) of the third layer 23 (the high dielectric constant layer) was 0, the radio transmission characteristic was the lowest. On the other hand, when $T_{m3}/T$ was increased from 0, the radio transmission characteristics were improved as a whole. Further, when the dielectric constant ratio ($\varepsilon_{m3}/\varepsilon_{m1,2}$) is focused on, as the dielectric constant ratio ($\varepsilon_{m3}/\varepsilon_{m1,2}$) increases, the radio transmission characteristics tend to be improved.

From the results of the simulation shown in FIG. 6, if the dielectric constant ratio is 1.20 or larger (that is, $\varepsilon_{m3}/\varepsilon_{m1} \geq 1.20$ and $\varepsilon_{m3}/\varepsilon_{m2} \geq 1.20$) and the ratio ($T_{m3}/T$) of the third layer 23 (the high dielectric constant layer) is 0.1 or larger, the radio wave transmittance in the millimeter wave band may be improved by 0.5 dB or more.

Further, from the results of the simulation shown in FIG. 6, if the dielectric constant ratio is 1.30 or larger (that is, $\varepsilon_{m3}/\varepsilon_{m1} \geq 1.30$ and $\varepsilon_{m3}/\varepsilon_{m2} \geq 1.30$) and the ratio ($T_{m3}/T$) of the thickness of the third layer 23 (the high dielectric constant layer) with respect to the thickness of the interlayer film 13_1 is 0.1 or larger, the radio wave transmittance in the millimeter wave band may be improved by 1 dB or more.

Further, from the results of the simulation shown in FIG. 6, it is further preferable that the dielectric constant ratio is 1.37 or larger. Further, if the dielectric constant ratio is 1.74 or larger but 2.11 or smaller (that is, $1.74 \leq \varepsilon_{m3}/\varepsilon_{m1} \leq 2.11$ and $1.74 \leq \varepsilon_{m3}/\varepsilon_{m2} \leq 2.11$) and the ratio ($T_{m3}/T$) of the thickness of the third layer 23 (the high dielectric constant layer) with respect to the thickness of the interlayer film 13_1 is 0.39 or larger but is smaller than 1, preferably 0.39 or larger but 0.87 or smaller, further preferably 0.39 or larger but 0.66 or smaller, the radio wave transmittance in the millimeter wave band can be particularly improved.

According to the invention with reference to this embodiment described above, it is possible to provide a laminated glass capable of increasing the radio wave transmittance in the millimeter wave band and satisfying the original strength of the laminated glass.

Second Embodiment

Figure 7:
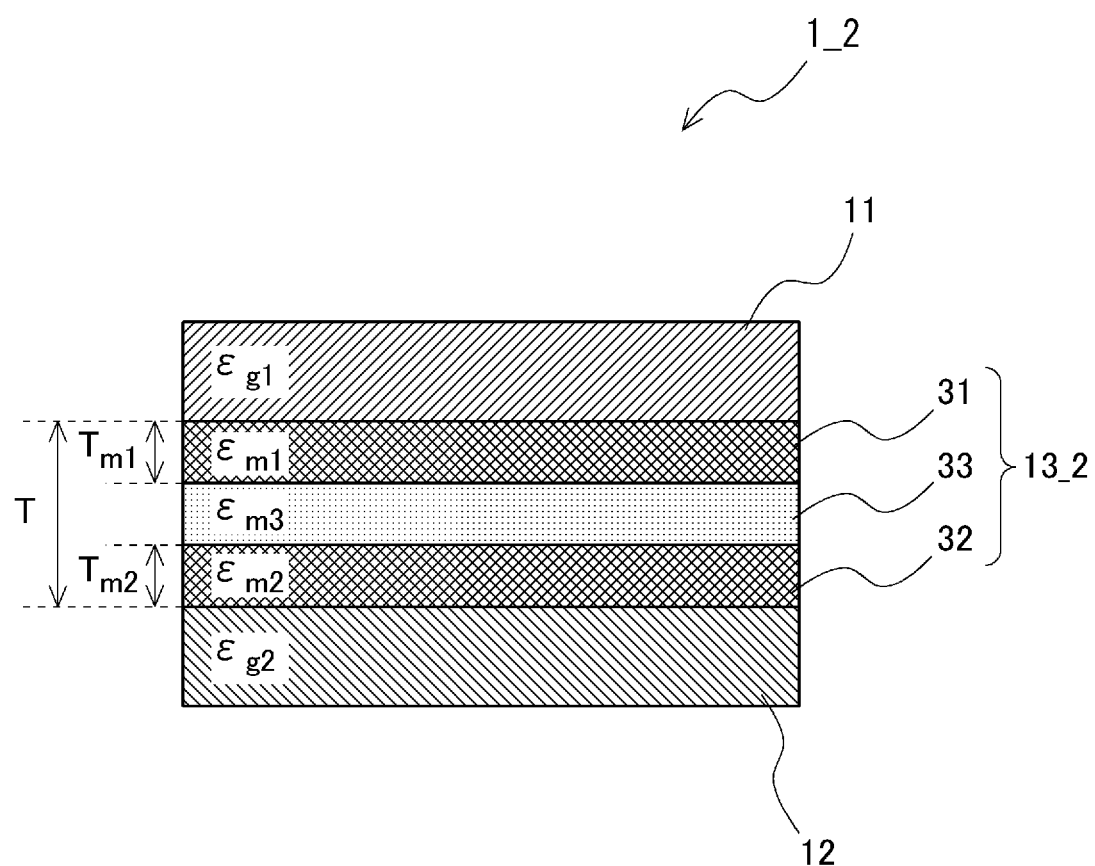
FIG. 7 is a cross-sectional view of a laminated glass according to a second embodiment.

Next, a second embodiment according to the present invention will be described. FIG. 7 is a cross-sectional view of a laminated glass according to the second embodiment. As shown in FIG. 7, a laminated glass 1_2 according to the second embodiment includes a first glass plate 11, a second glass plate 12, and an interlayer film 13_2 held between the first glass plate 11 and the second glass plate 12. The interlayer film 13_2 includes, in a plan view of the first glass plate 11, a laminated region including a first layer 31 that is in contact with the first glass plate 11, a second layer 32 that is in contact with the second glass plate 12, and a third layer 33 disposed between the first layer 31 and the second layer 32. That is, the interlayer film 13_2 may be formed of a laminated structure of three layers including the first layer 31, the third layer 33, and the second layer 32. The configuration of the interlayer film 13_2 of the laminated glass 1_2 according to this embodiment is different from the configuration of the interlayer film of the laminated glass 1_1 described in the first embodiment. Since the other configurations are similar to those of the laminated glass 1_1 described in the first embodiment, overlapping descriptions will be omitted as necessary.

When the relative dielectric constant of the first glass plate 11 in a predetermined frequency F is denoted by $\varepsilon_{g1}$, the relative dielectric constant of the second glass plate 12 in the predetermined frequency F is denoted by $\varepsilon_{g2}$, the relative dielectric constant of the first layer 31 of the interlayer film 13_2 in the predetermined frequency F is denoted by $\varepsilon_{m1}$, the relative dielectric constant of the second layer 32 in the predetermined frequency F is denoted by $\varepsilon_{m2}$, and the relative dielectric constant of the third layer 33 in the predetermined frequency F is denoted by $\varepsilon_{m3}$, the laminated glass 1_2 according to this embodiment has the following relationship. The predetermined frequency F is 60 to 100 GHz, and more specifically, 79 GHz.

That is, the laminated glass 1_2 has a relationship $$\varepsilon_{m1} > \varepsilon_{m3} \text{ and}$$

$$\varepsilon_{m2} > \varepsilon_{m3}$$

Further, when the thickness of the interlayer film 13_2 is denoted by T, the thickness of the first layer 31 is denoted by $T_{m1}$, and the thickness of the second layer 32 is denoted by $T_{m2}$, a relationship $$(T_{m1}+T_{m2})/T \geq 0.5$$

is established.

Specifically, in the laminated glass 1_2 according to this embodiment, the relative dielectric constants $\varepsilon_{m1}$ and $\varepsilon_{m2}$ of the first layer 31 and the second layer 32 of the interlayer film 13_2 are each made larger than the relative dielectric constant $\varepsilon_{m3}$ of the third layer 33. Further, the ratio (($T_{m1}$+$T_{m2}$)/T: it will be referred also to as the ratio of the high dielectric constant layer) of the thickness ($T_{m1}$+$T_{m2}$) of the first layer 31 and the second layer 32, which are high dielectric constant layers, with respect to the thickness T of the interlayer film 13_2 is set to be 0.5 or larger. The "high dielectric constant layers" here indicate some of the three layers that compose the interlayer film 13_2 that have dielectric constants higher than the relatively lowest dielectric constant, that is, the first layer 31 and the second layer 32.

In this embodiment, the respective elements of the laminated glass 1_2 have the aforementioned relationships, whereby the difference between dielectric constants in the interface may be decreased and the radio wave transmittance in the millimeter wave band may be increased. Further, in this embodiment, there is no need to remove a part of the components that compose the laminated glass 1_2, whereby the original strength of a laminated glass may be satisfied. That is, the laminated glass 1_2 according to this embodiment has a three-layer structure including the first glass plate 11, the second glass plate 12, and the interlayer film 13_2, whereby the original strength of a laminated glass may be satisfied.

Further, in the laminated glass 1_2 according to this embodiment, the relative dielectric constant $\varepsilon_{g1}$ of the first glass plate 11, the relative dielectric constant $\varepsilon_{g2}$ of the second glass plate 12, the relative dielectric constant $\varepsilon_{m1}$ of the first layer 31 of the interlayer film 13_2, and the relative dielectric constant $\varepsilon_{m2}$ of the second layer 32 of the interlayer film 13_2 may have relationships $\varepsilon_{m1}<\varepsilon_{g1}$, $\varepsilon_{m1}<\varepsilon_{g2}$, $\varepsilon_{m2}<\varepsilon_{g1}$, and $\varepsilon_{m2}<\varepsilon_{g2}$. That is, the relative dielectric constant $\varepsilon_{m1}$ of the first layer 31 of the interlayer film 13_2 and the relative dielectric constant $\varepsilon_{m2}$ of the second layer 32 of the interlayer film 13_2 may be lower than the relative dielectric constants $\varepsilon_{g1}$ and $\varepsilon_{g2}$ of the first glass plate 11 and the second glass plate 12. If they have the aforementioned relationships, the difference between dielectric constants in the interface may be decreased, whereby it is possible to prevent the reflection of the radio waves in the millimeter wave band of the laminated glass 1_2 and to increase the transmittance.

Further, in the laminated glass 1_2 according to this embodiment, the relative dielectric constant $\varepsilon_{m1}$ of the first layer 31 of the interlayer film 13_2, the relative dielectric constant $\varepsilon_{m2}$ of the second layer 32 of the interlayer film 13_2, and the relative dielectric constant $\varepsilon_{m3}$ of the third layer 33 of the interlayer film 13_2 may satisfy $\varepsilon_{m1}/\varepsilon_{m3} \geq 1.2$ and $\varepsilon_{m2}/\varepsilon_{m3} \geq 1.2$. It is therefore possible to improve the radio wave transmittance in the millimeter wave band of the laminated glass 1_2 by 0.5 dB or more.

Further, $\varepsilon_{m1}/\varepsilon_{m3} \geq 1.2$, $\varepsilon_{m2}/\varepsilon_{m3} \geq 1.2$, and $\varepsilon_{m1}/\varepsilon_{m3} \geq 1.3$ or $\varepsilon_{m2}/\varepsilon_{m3} \geq 1.3$ may be satisfied, $\varepsilon_{m1}/\varepsilon_{m3} \geq 1.2$, $\varepsilon_{m2}/\varepsilon_{m3} \geq 1.2$, and $\varepsilon_{m1}/\varepsilon_{m3} \geq 1.37$ or $\varepsilon_{m2}/\varepsilon_{m3} \geq 1.37$ may be satisfied, $\varepsilon_{m1}/\varepsilon_{m3} \geq 1.2$, $\varepsilon_{m2}/\varepsilon_{m3} \geq 1.2$, and $\varepsilon_{m1}/\varepsilon_{m3} \geq 1.74$ or $\varepsilon_{m2}/\varepsilon_{m3} \geq 1.74$ may be satisfied, $\varepsilon_{m1}/\varepsilon_{m3} \geq 1.2$, $\varepsilon_{m2}/\varepsilon_{m3} \geq 1.2$, and $\varepsilon_{m1}/\varepsilon_{m3} \geq 2.11$ or $\varepsilon_{m2}/\varepsilon_{m3} \geq 2.11$ may be satisfied.

In this description, the relative dielectric constant $\varepsilon_{m1}$ of the first layer 31 with respect to the relative dielectric constant $\varepsilon_{m3}$ of the third layer 33 is denoted by a "dielectric constant ratio: $\varepsilon_{m1}/\varepsilon_{m3}$". Likewise, the relative dielectric constant $\varepsilon_{m2}$ of the second layer 32 with respect to the relative dielectric constant $\varepsilon_{m3}$ of the third layer 33 is denoted by a "dielectric constant ratio: $\varepsilon_{m2}/\varepsilon_{m3}$". Further, when the relative dielectric constant $\varepsilon_{m1}$ of the first layer 31 is the same as the relative dielectric constant $\varepsilon_{m2}$ of the second layer 32, the "dielectric constant ratio: $\varepsilon_{m1}/\varepsilon_{m3}$" and the "dielectric constant ratio: $\varepsilon_{m2}/\varepsilon_{m3}$" are collectively referred to as a "dielectric constant ratio: $\varepsilon_{m1,2}/\varepsilon_{m3}$".

The laminated glass 1_2 according to this embodiment may further satisfy, when the thickness T of the interlayer film 13_2 is denoted by T, the thickness of the first layer 31 is denoted by $T_{m1}$, and the thickness of the second layer 32 is denoted by $T_{m2}$, $(T_{m1}+T_{m2})/T \geq 0.66$ or may satisfy $(T_{m1}+T_{m2})/T \geq 0.87$. While the interlayer film 13_2 satisfies $(T_{m1}+T_{m2})/T < 1$ since it includes the first layer 31, the second layer 32, and the third layer 33, it may satisfy $(T_{m1}+T_{m2})/T \leq 0.95$ or $(T_{m1}+T_{m2})/T < 0.90$. If they have the aforementioned relationships, the difference between dielectric constants in the interface may be decreased, whereby the radio wave transmittance in the millimeter wave band of the laminated glass 1_2 may be increased.

(Results of Simulations)

Figure 8:
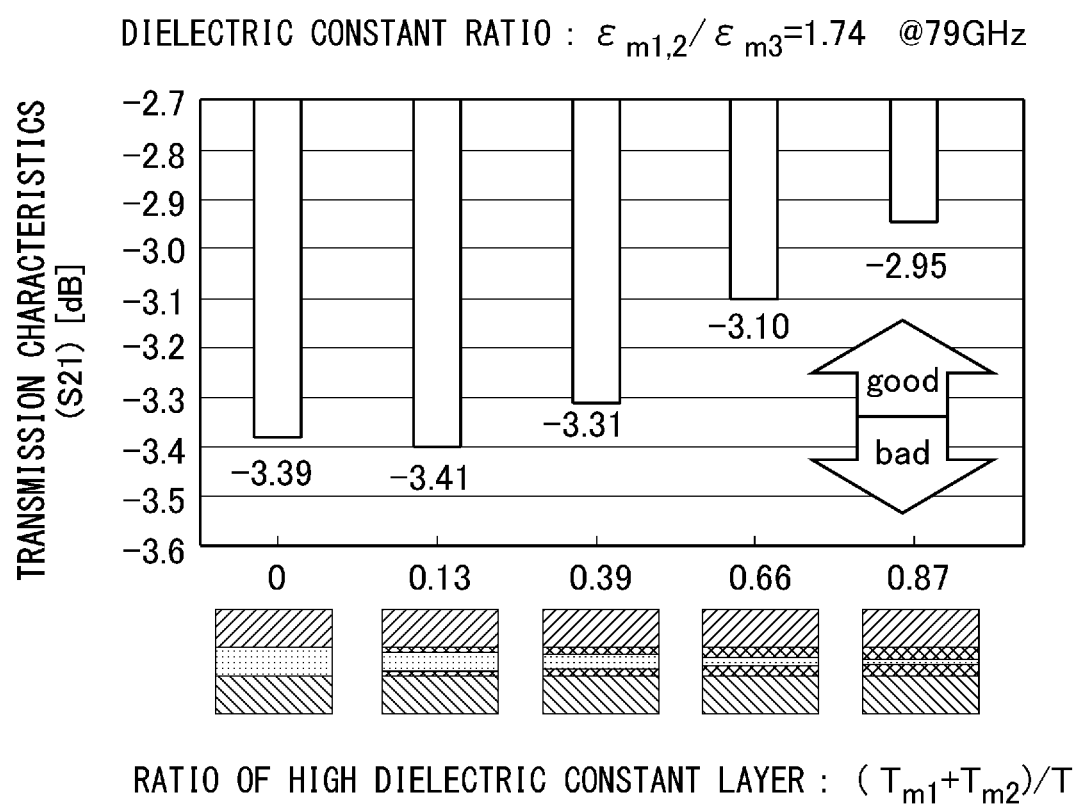
FIG. 8 shows results of a simulation indicating a relationship between a ratio of a high dielectric constant layer in an interlayer film and radio transmission characteristics in the laminated glass according to the second embodiment.

Next, results of simulations of the laminated glass 1_2 according to this embodiment will be explained. FIG. 8, which is a graph showing results of simulating the laminated glass according to this embodiment, shows results of the simulation indicating a relationship between the ratio of a high dielectric constant layer (the first layer 31 and the second layer 32) in the interlayer film 13_2 (see FIG. 7) and the radio transmission characteristics.

The conditions of the simulation shown in FIG. 8 are as follows.

The dielectric constant ratio of the interlayer film 13_2 (see FIG. 7) was $\varepsilon_{m1,2}/\varepsilon_{m3}=1.74$. Specifically, the relative dielectric constant $\varepsilon_{m1}$ of the first layer 31 of the interlayer film 13_2 was 4.7, the relative dielectric constant $\varepsilon_{m2}$ of the second layer 32 was 4.7, and the relative dielectric constant $\varepsilon_{m3}$ of the third layer 33 was 2.7. Further, the relative dielectric constant $\varepsilon_{g1}$ of the first glass plate 11 was 7 and the relative dielectric constant $\varepsilon_{g2}$ of the second glass plate 12 was 7. It was assumed that the first glass plate 11 and the second glass plate 12 were the glass the same as that used in the first embodiment and that the third layer 33 was polyvinyl butyral (PVB).

The thickness of each of the first glass plate 11 and the second glass plate 12 was 2 mm. The thickness T of the interlayer film 13_2 was constant, namely, 0.76 mm. The total $(T_{m1}+T_{m2})$ of the first layer 31 and the second layer 32 was 0 mm (related example), 0.1 mm, 0.3 mm, 0.5 mm, and 0.66 mm. Except for a case in which the total $(T_{m1}+T_{m2})$ of the first layer 31 and the second layer 32 is 0 mm, the first layer 31 and the second layer 32, which are the high dielectric constant layers, have the same thickness. The ratio $((T_{m1}+T_{m2})/T)$ of the thickness $(T_{m1}+T_{m2})$ of the first layer 31 and the second layer 32, which are the high dielectric constant layers, with respect to the thickness T of the interlayer film 13_2 was 0, 0.13, 0.39, 0.66, and 0.87. The frequency in the simulation was 79 GHz. The incident angle of the radio waves in the millimeter wave band was 67.5 degrees with respect to the main surface of the laminated glass 1_2. The results of the simulation of the radio transmission characteristics (S21) under the above conditions are shown in FIG. 8.

As shown in FIG. 8, in the related case in which the ratio $((T_{m1}+T_{m2})/T)$ of the high dielectric constant layers (the first layer 31 and the second layer 32) was 0, the radio transmission characteristic of the millimeter wave band was low. On the other hand, as the ratio $((T_{m1}+T_{m2})/T)$ of the high dielectric constant layers was increased from 0, the radio transmission characteristics of the millimeter wave band tended to be improved. Therefore, by providing the high dielectric constant layers (the first layer 31 and the second layer 32) in the interlayer film 13_2, the radio transmission characteristics of the laminated glass are improved.

Figure 9:
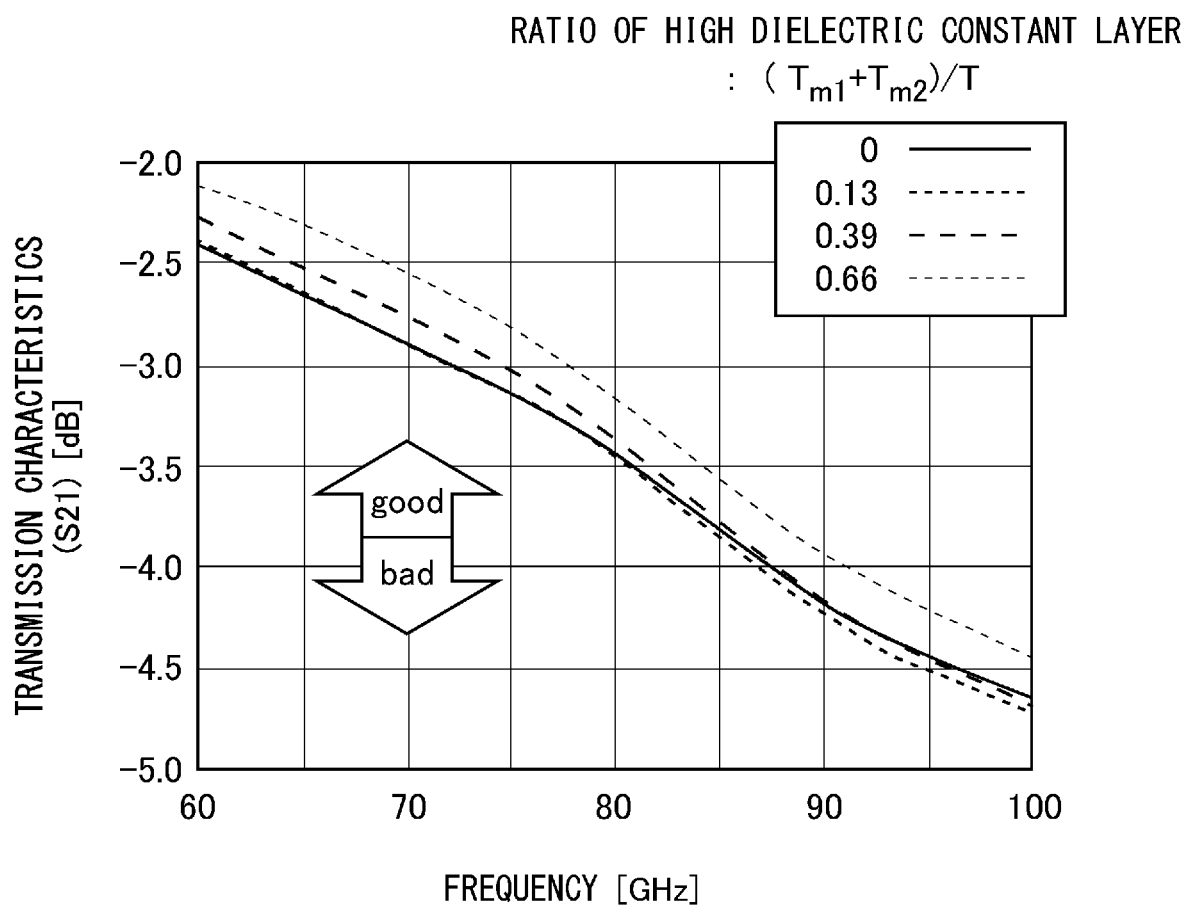
FIG. 9 shows results of a simulation indicating radio transmission characteristics in a predetermined frequency band of the laminated glass according to the second embodiment.

Next, results of a simulation shown in FIG. 9 will be explained. FIG. 9 shows results of a simulation indicating radio transmission characteristics in a predetermined frequency band of the laminated glass. The conditions of the simulation shown in FIG. 9 are basically the same as the conditions of the simulation shown in FIG. 8.

In FIG. 9, unlike the conditions of the simulation shown in FIG. 8, the frequency of the radio waves in the millimeter wave band that are made incident on the laminated glass 1_2 is 60 to 100 GHz.

As shown in the results of the simulation shown in FIG. 9, as the frequency is changed from 60 to 100 GHz, radio transmission characteristics were decreased. That is, it can be said from this result that, as the frequency of the radio waves that are made incident on the laminated glass 1_2 becomes higher, the radio transmission characteristics of the millimeter wave band are decreased.

Further, when the ratio $((T_{m1}+T_{m2})/T)$ of the high dielectric constant layers (the first layer 31 and the second layer 32) is focused on, when the ratio $((T_{m1}+T_{m2})/T)$ of the high dielectric constant layers is 0.39 or larger, the radio transmission characteristics of the millimeter wave band in the frequency band from 60 to 100 GHz, and especially, for example, in 79 GHz tended to be improved. In particular, the radio transmission characteristics of the millimeter wave band in the frequency band from 60 to 100 GHz have been remarkably improved when the ratio $((T_{m1}+T_{m2})/T)$ of the high dielectric constant layers was 0.66 or larger. It has therefore been demonstrated that, by providing the high dielectric constant layers (the first layer 31 and the second layer 32) in the interlayer film 13_2, the radio transmission characteristics of the millimeter wave band of the laminated glass from 60 to 100 GHz are improved.

Figure 10:
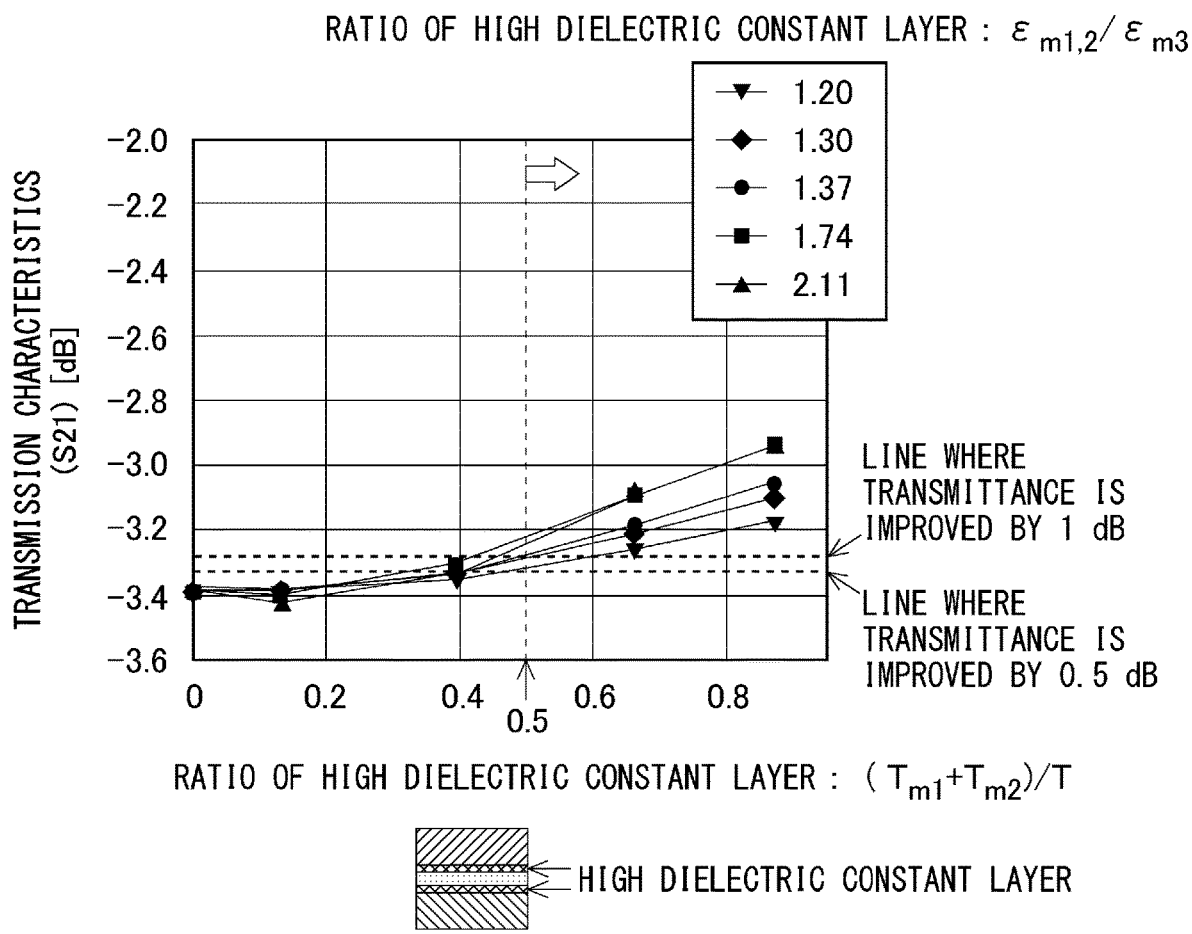
FIG. 10 shows results of a simulation indicating a relationship between a ratio of the high dielectric constant layer in the interlayer film and the radio transmission characteristics in the laminated glass according to the second embodiment.

Next, results of a simulation shown in FIG. 10 will be explained. FIG. 10, which is a graph showing results of simulating the laminated glass according to this embodiment, shows results of the simulation indicating a relationship between the ratio of the high dielectric constant layer (the first layer 31 and the second layer 32) in the interlayer film 13_2 (see FIG. 7) and the radio transmission characteristics. While FIG. 8 shows the results of the simulation when the dielectric constant ratio $(\varepsilon_{m1,2}/\varepsilon_{m3})$ of the interlayer film 13_2 is 1.74, FIG. 10 collectively shows the results of the simulation when the dielectric constant ratio $(\varepsilon_{m1,2}/\varepsilon_{m3})$ is 1.20, 1.30, 1.37, 1.74, and 2.11.

In the conditions of the simulation in FIG. 10, the relative dielectric constant $\varepsilon_{m3}$ of the third layer 33 of the interlayer film 13_2 was fixed to 2.7, the relative dielectric constants $\varepsilon_{m1}$ and $\varepsilon_{m2}$ of the first layer 31 and the second layer 32 were 3.24, 3.51, 3.7, 4.7, and 5.7. That is, the conditions of the dielectric constant ratio $(\varepsilon_{m1,2}/\varepsilon_{m3})$ were 1.20, 1.30, 1.37, 1.74, and 2.11. The other conditions of the simulation are similar to the conditions of the simulation in FIG. 8.

As shown in FIG. 10, in the related example in a case in which the ratio $((T_{m1}+T_{m2})/T)$ of the high dielectric constant layers was 0, the radio transmission characteristic was low. On the other hand, when the ratio $((T_{m1}+T_{m2})/T)$ of the high dielectric constant layers was increased from 0, the radio transmission characteristics of the millimeter wave band tended to be improved as a whole. Further, when the dielectric constant ratio $(\varepsilon_{m1,2}/\varepsilon_{m3})$ is focused on, as the dielectric constant ratio $(\varepsilon_{m1,2}/\varepsilon_{m3})$ increases, the radio transmission characteristics of the millimeter wave band tended to be improved.

From the results of the simulation shown in FIG. 10, if the dielectric constant ratio is 1.20 or larger (that is, $\varepsilon_{m1}/\varepsilon_{m3} \geq 1.20$ and $\varepsilon_{m2}/\varepsilon_{m3} \geq 1.20$) and the ratio $((T_{m1}+T_{m2})/T)$ of the high dielectric constant layers (the first layer 31 and the second layer 32) is 0.5 or larger but is smaller than 1, the radio wave transmittance in the millimeter wave band may be improved by 0.5 dB or more.

Further, from the results of the simulation shown in FIG. 10, if the dielectric constant ratio is 1.30 or larger (that is, $6.1/\varepsilon_{m3} \geq 1.30$ and $\varepsilon_{m2}/\varepsilon_{m3} \geq 1.30$) and the ratio $((T_{m1}+T_{m2})/T)$ of the high dielectric constant layers (the first layer 31 and the second layer 32) is 0.5 or larger but is smaller than 1, the radio wave transmittance in the millimeter wave band may be improved by 1 dB or more.

Further, from the results of the simulation shown in FIG. 10, the dielectric constant ratio is preferably 1.37 or larger. Further, if the dielectric constant ratio is 1.74 or larger but is 2.11 or smaller (that is, $1.74 \leq \varepsilon_{m1}/\varepsilon_{m3} \leq 2.11$ and $1.74 \leq \varepsilon_{m2}/\varepsilon_{m3} \leq 2.11$) and the ratio $((T_{m1}+T_{m2})/T)$ of the high dielectric constant layers is 0.66 or larger but is smaller than 1, preferably 0.87 or larger but is smaller than 1, the radio wave transmittance in the millimeter wave band can be particularly improved.

According to the invention with reference to this embodiment described above, it is possible to provide a laminated glass capable of increasing the radio wave transmittance in the millimeter wave band and satisfying the original strength of the laminated glass.

Third Embodiment

Figure 11:
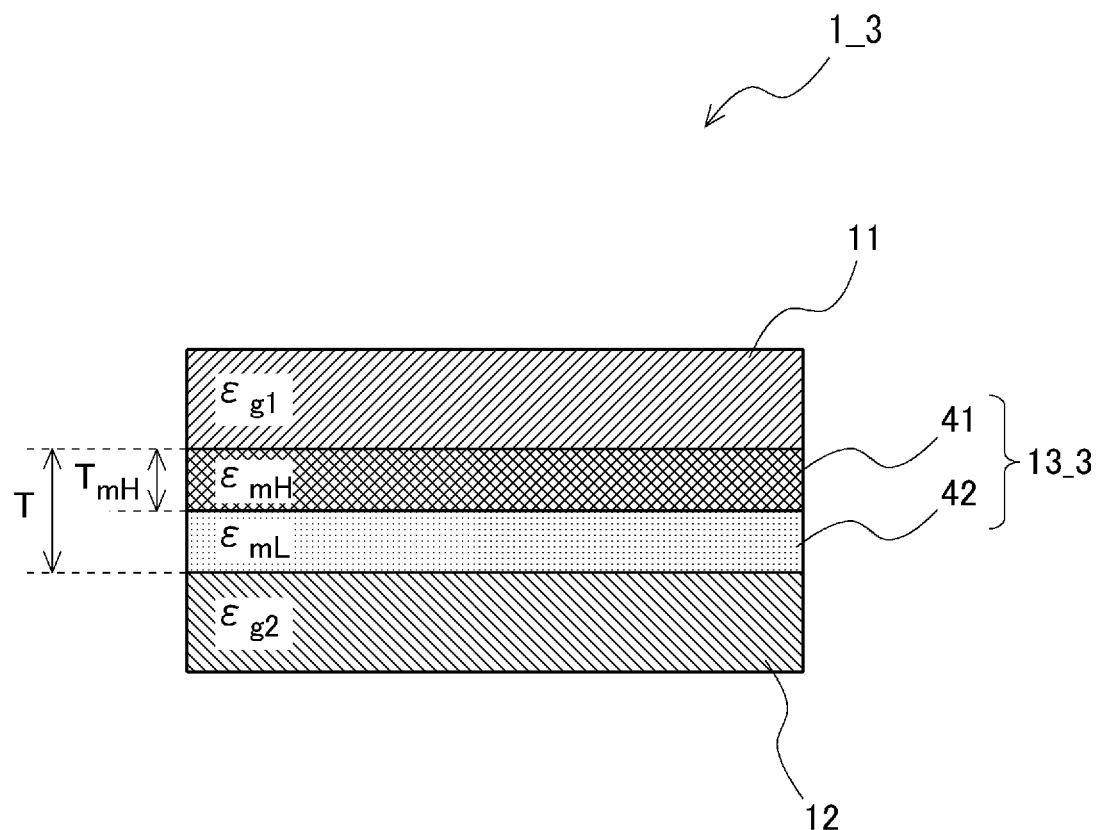
FIG. 11 is a cross-sectional view of a laminated glass according to a third embodiment.

Next, a third embodiment according to the present invention will be described. FIG. 11 is a cross-sectional view of a laminated glass according to the third embodiment. As shown in FIG. 11, a laminated glass 1_3 according to the third embodiment includes a first glass plate 11, a second glass plate 12, and an interlayer film 13_3 held between the first glass plate 11 and the second glass plate 12. The interlayer film 13_3 includes, in a plan view of the first glass plate 11, a laminated region including a first layer 41 that is in contact with the first glass plate 11 and a second layer 42 that is in contact with the second glass plate 12. The configuration of the interlayer film 13_3 of the laminated glass 1_3 according to this embodiment is different from the configuration of the interlayer film of the laminated glass 1_1 described in the first embodiment. That is, in the laminated glass 1_3 according to this embodiment, the interlayer film 13_3 has a two-layer structure. Since the other configurations are similar to those of the laminated glass 1_1 described in the first embodiment, overlapping descriptions will be omitted as necessary.

When the relative dielectric constant of the first glass plate 11 in a predetermined frequency F is denoted by $\varepsilon_{g1}$, the relative dielectric constant of the second glass plate 12 in the predetermined frequency F is denoted by $\varepsilon_{g2}$, the relative dielectric constant of the first layer 41 of the interlayer film 13_3 in the predetermined frequency F is denoted by $\varepsilon_{mH}$, and the relative dielectric constant of the second layer 42 in the predetermined frequency F is denoted by $\varepsilon_{mL}$, the laminated glass 1_3 according to this embodiment has the following relationship. The predetermined frequency F is 60 to 100 GHz, and more specifically, 79 GHz.

That is, the laminated glass 1_3 has relationships of $$\varepsilon_{mH} < \varepsilon_{g1}, \varepsilon_{mH} < \varepsilon_{g2} \text{ and}$$

$$\varepsilon_{mL} < \varepsilon_{g1}, \varepsilon_{mL} < \varepsilon_{g2}.$$

Further, when the thickness of the interlayer film 13_3 is denoted by T and the thickness of the first layer 41 is denoted by $T_{mH}$, a relationship $$T_{mH}/T \geq 0.3$$

is established.

Specifically, in the laminated glass 1_3 according to this embodiment, the relative dielectric constant $\varepsilon_{mH}$ of the first layer 41 of the interlayer film 13_3 is made higher than the relative dielectric constant $\varepsilon_{mL}$ of the second layer 42. Further, the ratio $(T_{mH}/T$: it will be referred also to as the ratio of the high dielectric constant layer) of the thickness $T_{mH}$ of the first layer 41, which is a high dielectric constant layer, with respect to the thickness T of the interlayer film 13_3 is set to be 0.3 or larger. The "high dielectric constant layer" here indicates one of the two layers that compose the interlayer film 13_3 that has a relatively higher dielectric constant, that is, in this case, the first layer 41.

While one of the first layer 41 and the second layer 42 that has a relatively higher dielectric constant is the first layer 41 and the other one of them that has a relatively lower dielectric constant is the second layer 42 in FIG. 11, they may have an opposite relationship. That is, one of the first layer 41 and the second layer 42 that has a relatively higher dielectric constant may be the second layer 42 and the other one of them that has a relatively lower dielectric constant may be the first layer 41. In this case, the relative dielectric constant of the first layer 41 is denoted by $\varepsilon_{mL}$ and the relative dielectric constant of the second layer 42 is denoted by $\varepsilon_{mH}$.

As described above, in this embodiment, since the respective elements of the laminated glass 1_3 have the aforementioned relationships, the difference between dielectric constants in the interface may be decreased, whereby it is possible to prevent the reflection of radio waves in the millimeter wave band and to increase the transmittance. Further, in this embodiment, there is no need to remove a part of the elements that compose the laminated glass 1_3, whereby the original strength of a laminated glass may be satisfied. That is, the laminated glass 1_3 according to this embodiment has a three-layer structure including the first glass plate 11, the second glass plate 12, and the interlayer film 13_3, whereby the original strength of a laminated glass may be satisfied.

Further, in the laminated glass 1_3 according to this embodiment, the relative dielectric constant $\varepsilon_{mH}$ of the first layer 41 of the interlayer film 13_3 and the relative dielectric constant $\varepsilon_{mL}$ of the second layer 42 of the interlayer film 13_3 may satisfy $\varepsilon_{mH}/\varepsilon_{mL} \geq 1.2$. Accordingly, the radio wave transmittance in the millimeter wave band of the laminated glass 1_3 may be improved by 0.5 dB or more.

Further, $\varepsilon_{mH}/\varepsilon_{mL} \geq 1.3$ may be satisfied, $\varepsilon_{mH}/\varepsilon_{mL} \geq 1.37$ may be satisfied, or $\varepsilon_{mH}/\varepsilon_{mL} \geq 1.74$ may be satisfied.

In this description, the relative dielectric constant $\varepsilon_{mH}$ of the first layer 41 with respect to the relative dielectric constant $\varepsilon_{mL}$ of the second layer 42 is expressed by a "dielectric constant ratio: $\varepsilon_{mH}/\varepsilon_{mL}$".

When the thickness of the interlayer film 13_3 is denoted by T and the thickness of the first layer 41, which is a high dielectric constant layer, is denoted by $T_{mH}$, the laminated glass 1_3 according to this embodiment may further satisfy $T_{mH}/T \geq 0.39$, $T_{mH}/T \geq 0.50$, $T_{mH}/T \geq 0.66$, or $T_{mH}/T \geq 0.87$. While the interlayer film 13_3 satisfies $T_{mH}/T < 1$ since it includes the first layer 41 and the second layer 42, it may satisfy $T_{mH}/T \leq 0.95$ or $T_{mH}/T < 0.90$. If they have the aforementioned relationships, the radio wave transmittance in the millimeter wave band of the laminated glass 1_3 may be increased.

(Results of Simulations)

Figure 12:
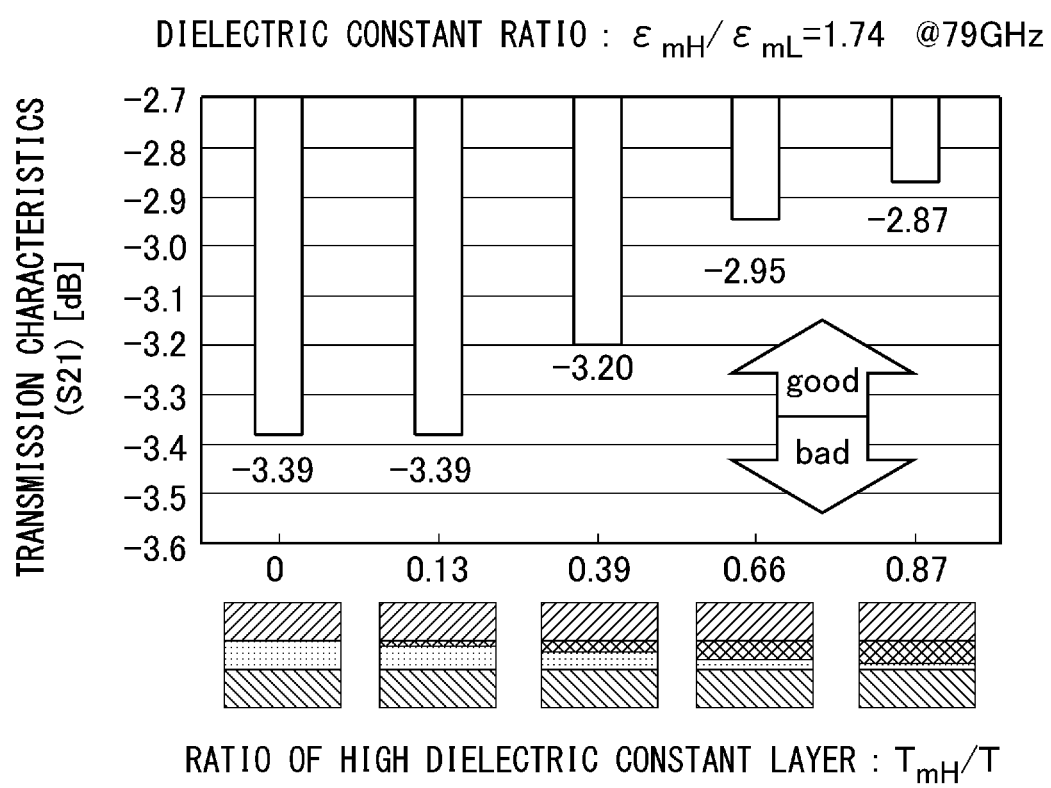
FIG. 12 shows results of a simulation indicating a relationship between a ratio of a high dielectric constant layer in an interlayer film and radio transmission characteristics in the laminated glass according to the third embodiment.

Next, results of simulations of the laminated glass 1_3 according to this embodiment will be explained. FIG. 12, which is a graph showing results of simulating the laminated glass according to this embodiment, shows results of the simulation indicating a relationship between the ratio of the first layer 41 (high dielectric constant layer) in the interlayer film 13_3 (see FIG. 11) and the radio transmission characteristics.

The conditions of the simulation shown in FIG. 12 are as follows.

The dielectric constant ratio of the interlayer film 13_3 (see FIG. 11) was $\varepsilon_{mH}/\varepsilon_{mL} = 1.74$. Specifically, the relative dielectric constant $\varepsilon_{mH}$ of the first layer 41 of the interlayer film 13_3 was 4.7, and the relative dielectric constant $\varepsilon_{mL}$ of the second layer 42 was 2.7. Further, the relative dielectric constant $\varepsilon_{g1}$ of the first glass plate 11 was 7 and the relative dielectric constant $\varepsilon_{g2}$ of the second glass plate 12 was 7. Note that it was assumed that the first glass plate 11 and the second glass plate 12 were the glass the same as that used in the first embodiment and the second layer 42 was polyvinyl butyral (PVB).

The thickness of each of the first glass plate 11 and the second glass plate 12 was 2 mm. The thickness T of the interlayer film 13_3 was constant, namely, 0.76 mm. The thickness $T_{mH}$ of the first layer 41 (high dielectric constant layer) was 0 mm (related example), 0.1 mm, 0.3 mm, 0.5 mm, and 0.66 mm. The ratio ($T_{mH}/T$) of the first layer 41 (high dielectric constant layer) in this case was 0 (related example), 0.13, 0.39, 0.66, and 0.87. The frequency in the simulation was 79 GHz. The incident angle of the radio waves was 67.5 degrees with respect to the main surface of the laminated glass 1_3. Further, radio waves of millimeter waves were set so that they are made incident from the direction of the first glass plate 11. FIG. 12 shows results of simulating the radio transmission characteristics (S21) under the above conditions.

As shown in FIG. 12, in the related case in which the ratio ($T_{mH}/T$) of the first layer 41 (high dielectric constant layer) was 0, the radio transmission characteristic of the millimeter wave band was low. On the other hand, as $T_{mH}/T$ was increased from 0, the radio transmission characteristic was improved. When $T_{mH}/T = 0.87$, the radio transmission characteristic of the millimeter wave band was improved most significantly. Therefore, by providing the first layer 41, which is a high dielectric constant layer, in the interlayer film 13_3, the radio transmission characteristics of the millimeter wave band of the laminated glass are improved.

Figure 13:
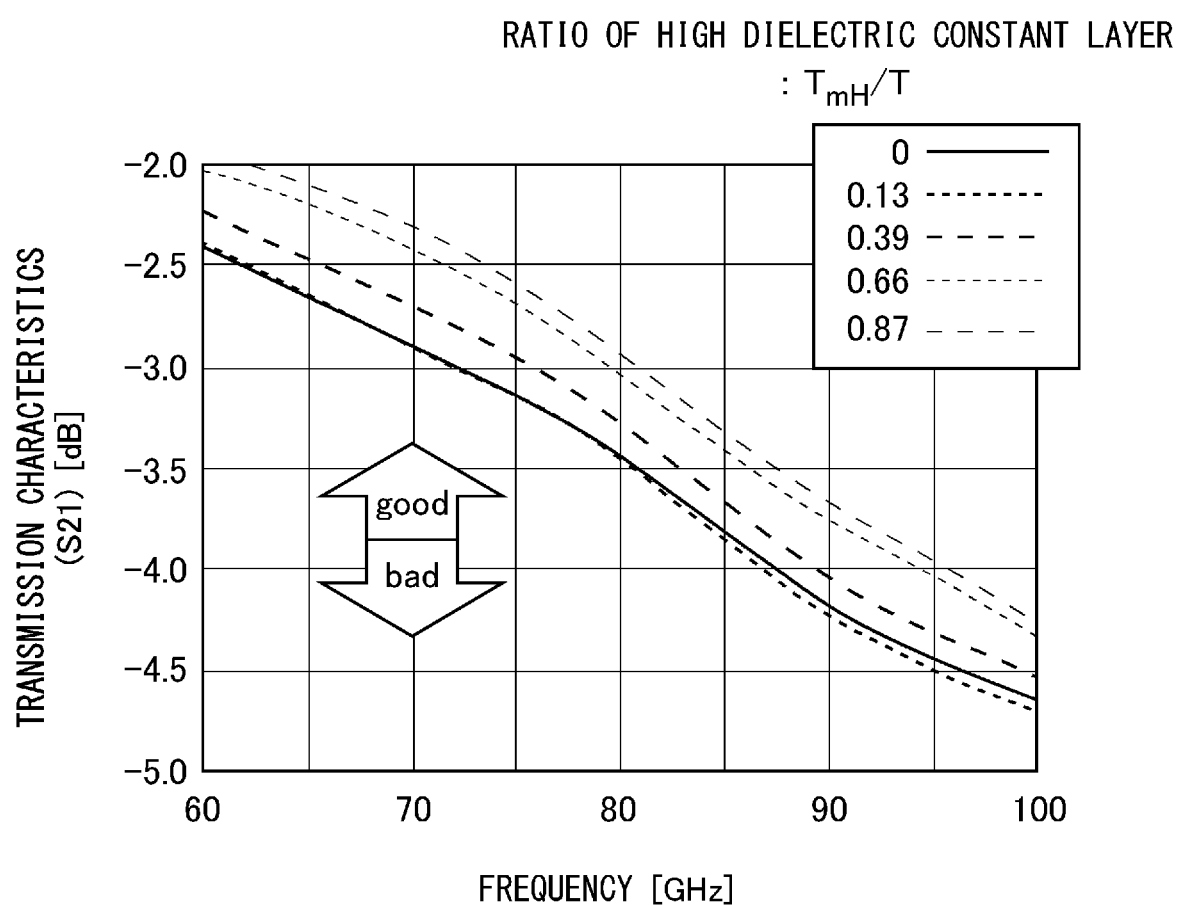
FIG. 13 shows results of a simulation indicating radio transmission characteristics in a predetermined frequency band of the laminated glass according to the third embodiment.

Next, results of a simulation shown in FIG. 13 will be explained. FIG. 13 shows results of a simulation indicating radio transmission characteristics in a predetermined frequency band of the laminated glass. The conditions of the simulation shown in FIG. 13 are basically the same as the conditions of the simulation shown in FIG. 12. The conditions of the simulation in FIG. 13 are different from the conditions of the simulation in FIG. 12 in that the frequency of the radio waves in the millimeter wave band that are made incident on the laminated glass 1_3 is set from 60 to 100 GHz.

As shown in the results of the simulation shown in FIG. 13, as the frequency is changed from 60 to 100 GHz, the radio transmission characteristics of the millimeter wave band were decreased. That is, it can be said from this result that, as the frequency of the radio waves in the millimeter wave band that are made incident on the laminated glass 1_3 becomes higher, the radio transmission characteristics of the millimeter wave band are reduced.

Further, when the ratio ($T_{mH}/T$) of the first layer 41 (high dielectric constant layer) is focused on, when $T_{mH}/T$ is 0.39 or larger but is smaller than 1, the radio transmission characteristics of the millimeter wave band have been improved in the frequency band from 60 to 100 GHz. It has therefore been demonstrated that, by providing the first layer 41, which is a high dielectric constant layer, in the interlayer film 13_3, the radio transmission characteristics of the laminated glass from 60 to 100 GHz are improved.

Figure 14:
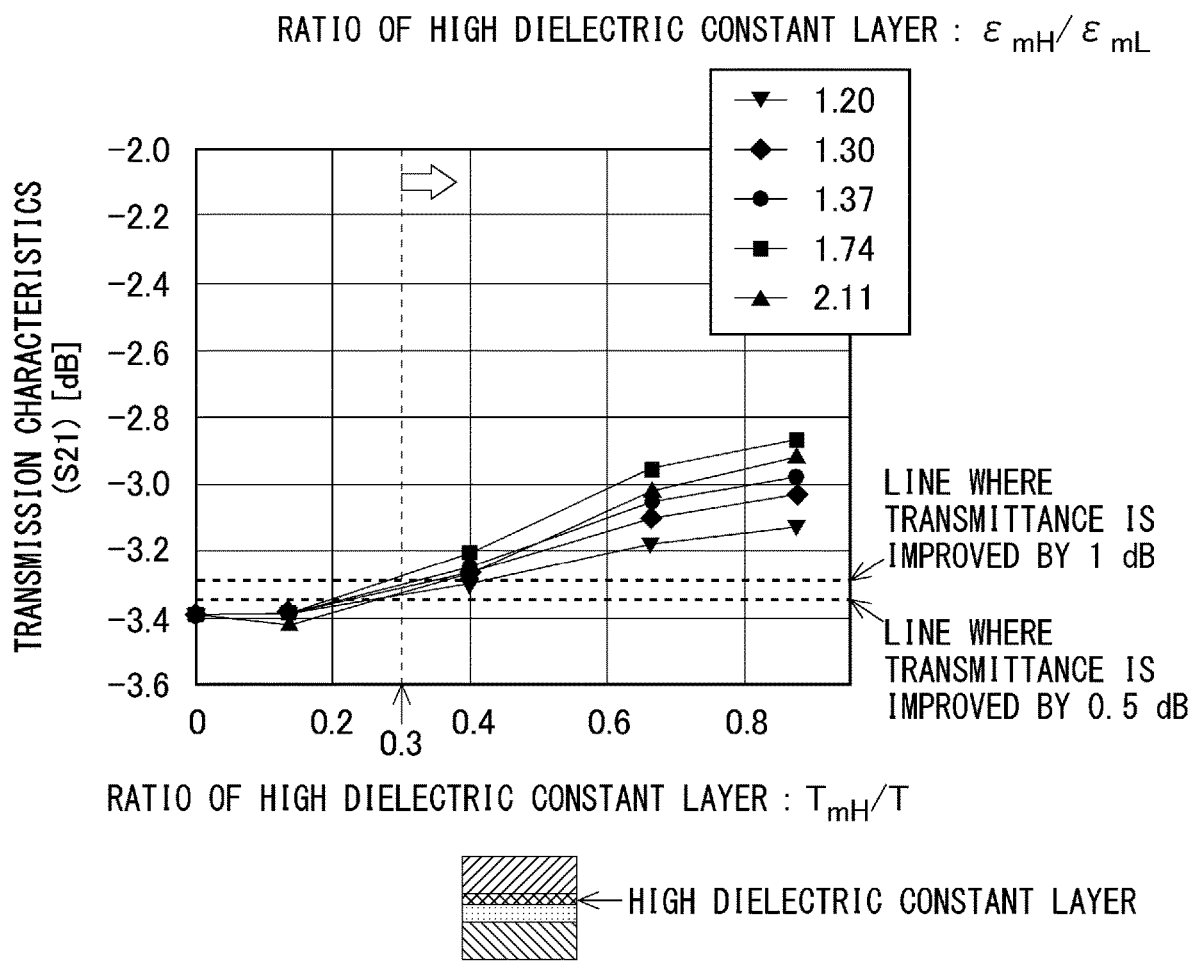
FIG. 14 shows results of a simulation indicating a relationship between a ratio of the high dielectric constant layer in the interlayer film and the radio transmission characteristics in the laminated glass according to the third embodiment.

Next, results of a simulation shown in FIG. 14 will be explained. FIG. 14, which is a graph showing results of simulating the laminated glass according to this embodiment, shows results of the simulation indicating a relationship between the ratio of the first layer 41 (high dielectric constant layer) in the interlayer film 13_3 (see FIG. 11) and the radio transmission characteristics. While FIG. 12 above shows the results of the simulation when the dielectric constant ratio ($\varepsilon_{mH}/\varepsilon_{mL}$) of the interlayer film 13_3 is 1.74, FIG. 14 collectively shows results of the simulation when the dielectric constant ratio ($\varepsilon_{mH}/\varepsilon_{mL}$) is 1.20, 1.30, 1.37, 1.74, and 2.11.

In the conditions of the simulation shown in FIG. 14, the relative dielectric constant $\varepsilon_{mL}$ of the second layer 42 of the interlayer film 13_3 was fixed to 2.7 and the relative dielectric constant $\varepsilon_{mH}$ of the first layer 21 was 3.24, 3.51, 3.7, 4.7, and 5.7. That is, the conditions of the dielectric constant ratio ($\varepsilon_{mH}/\varepsilon_{mL}$) were 1.20, 1.30, 1.37, 1.74, and 2.11. The other conditions of the simulation were similar to those shown in FIG. 12.

As shown in FIG. 14, when the ratio ($T_{mH}/T$) of the first layer 41 (high dielectric constant layer) was 0 (related example), the radio transmission characteristic was low. On the other hand, when $T_{mH}/T$ was increased from 0, the radio transmission characteristics tended to be improved as a whole. Further, when the dielectric constant ratio ($\varepsilon_{mH}/\varepsilon_{mL}$) is focused on, the radio transmission characteristic was the best when the dielectric constant ratio ($\varepsilon_{mH}/\varepsilon_{mL}$) was 1.74.

It is seen from the results of the simulation shown in FIG. 14 that, if the dielectric constant ratio is 1.20 or larger (that is, $\varepsilon_{mH}/\varepsilon_{mL} \geq 1.20$), and the ratio ($T_{mH}/T$) of the first layer 41 (high dielectric constant layer) is 0.3 or larger but is smaller than 1, the radio wave transmittance in the millimeter wave band may be improved by 0.5 dB or more.

It is further seen from the results of the simulation shown in FIG. 14 that, if the dielectric constant ratio is 1.30 or larger (that is, $\varepsilon_{mH}/\varepsilon_{mL} \geq 1.30$), and the ratio ($T_{mH}/T$) of the first layer 41 (high dielectric constant layer) is 0.35 or larger but is smaller than 1, the radio wave transmittance in the millimeter wave band can be improved by 1 dB or more.

It is further seen from the results of the simulation shown in FIG. 14 that, if the dielectric constant ratio is 1.37 or larger but is 2.11 or smaller (that is, $1.37 \leq \varepsilon_{mH}/\varepsilon_{mL} \leq 2.11$), and the ratio ($T_{mH}/T$) of the first layer 41 (high dielectric constant layer) is 0.66 or larger but is smaller than 1, preferably 0.87 or larger but is smaller than 1, the radio wave transmittance in the millimeter wave band can be particularly improved.

According to the invention with reference to this embodiment described above, it is possible to provide a laminated glass that increases the radio wave transmittance in the millimeter wave band and satisfies the original strength of a laminated glass.

As described in the aforementioned first to third embodiments, in the present invention, a plurality of layers including high dielectric constant layers are included in the interlayer films 13_1 to 13_3, whereby the radio wave transmittance in the millimeter wave band of the laminated glass may be increased. That is, in the laminated glass 1 shown in FIG. 2, the relative dielectric constants of the first glass plate 11 and the second glass plate 12 are higher than that of the interlayer film 13. Therefore, the difference between the dielectric constant of the first glass plate 11 and that of the interlayer film 13 and the difference between the dielectric constant of the second glass plate 12 and that of the interlayer film 13 become large. Accordingly, when radio waves in the millimeter wave band are transmitted through the laminated glass 1, radio waves are reflected in the interface between the first glass plate 11 and the interlayer film 13 and the interface between the second glass plate 12 and the interlayer film 13, and the radio wave transmittance is decreased.

In the present invention, in order to prevent the reflection of the radio waves, the interlayer films 13_1 to 13_3 (see FIGS. 3, 7, and 11) include high dielectric constant layers.

In this way, by including the high dielectric constant layers in the interlayer films 13_1 to 13_3, it is possible to prevent radio waves from being reflected in the interface between the first glass plate 11 and the interlayer film 13 and the interface between the second glass plate 12 and the interlayer film 13. Accordingly, the radio wave transmittance in the millimeter wave band of the laminated glass can be increased.

The case in which the interlayer films 13_1 and 13_2 each have a three-layer structure has been explained in the aforementioned first and second embodiments and the case in which the interlayer film 13_3 has a two-layer structure has been explained in the aforementioned third embodiment. However, in the present invention, the interlayer films 13_1 to 13_3 may further include layers other than the above layers. In the present invention, for example, a sound insulation layer may be further included in each of the interlayer films 13_1 to 13_3. The sound insulation layer may have, for example, a laminated structure of three layers including one core layer held by a first skin layer and a second skin layer provided on the respective surfaces of the core layer, and the sound insulation layer can maintain sound insulation properties by making the elastic modulus of the core layer smaller than the elastic modulus of the first skin layer and that of the second skin layer. The elastic modulus is a value of a storage elastic modulus when frequency dispersion measurement is performed at a strain of 0.05% using a dynamic viscoelasticity measurement device (DMA). For example, a part of each of the interlayer films 13_1 to 13_3 may be the sound insulation layer, or the three-layer structure itself of each of the interlayer film 13_1 and the interlayer film 13_2 may have a configuration of the sound insulation layer, as will be described later. In this manner, by including the sound insulation layer, sound insulation properties of a laminated glass can be increased. The sound insulation layer is included in a desired layer of each of the interlayer films 13_1 to 13_3.

Further, in the present invention, a plurality of layers may be included in one layer (e.g., the third layer 23 shown in FIG. 3). In other words, one layer (e.g., the third layer 23 shown in FIG. 3) may be formed by laminating a plurality of layers. In the present invention, one layer (e.g., the third layer 23 shown in FIG. 3) may be a set of a plurality of layers having the same relative dielectric constant. Alternatively, in the present invention, one layer (e.g., the third layer 23 shown in FIG. 3) may be a layer of a set of a plurality of layers having different relative dielectric constants.

In this case, the average of the different relative dielectric constants of the plurality of respective layers is regarded as a relative dielectric constant of one layer (e.g., the third layer 23 shown in FIG. 3).

In the present invention, as described above, the interlayer films 13_1 to 13_3 may be configured so as to contain at least one type selected from polyvinyl butyral (PVB), ethylene vinyl acetate (EVA) cycloolefin polymer, urethane resin, polyvinylidene fluoride resin (PVDF) and the like. The relative dielectric constants of the interlayer films 13_1 to 13_3 may be adjusted by a material used for the interlayer films 13_1 to 13_3. Further, the relative dielectric constants of the interlayer films 13_1 to 13_3 may be adjusted by adding a filler having a high dielectric constant to the aforementioned PVB, EVA or the like. That is, one of the layers that compose the interlayer films 13_1 to 13_3 having a high relative dielectric constant may be formed by adding a filler having a high dielectric constant into a resin material (e.g., PVB or EVA). The filler having a high dielectric constant may be glass frit, ceramics (aluminum nitride, cordierite, barium titanate ($BaTiO_3$), etc.), titania ($TiO_2$), polybutylene terephthalate, polyvinylidene fluoride, alumina ($Al_2O_3$) and the like. More specifically, the interlayer films 13_1 to 13_3 may contain at least one type selected from the group consisting $Al_2O_3$, $TiO_2$, $SiO_2$, $ZrO_2$, YSZ, $SnO_2$, forsterite, cordierite, steatite, barium magnesium niobate, barium neodymium titanate, lead zirconate titanate (PZT), borosilicate glass, non-alkaline glass, glass fibers, soda-lime glass, phosphate glass, $BaTiO_3$, $SrTiO_3$, $BaSrTiO_3$, aluminum nitride, and $MnO_2$ in order to adjust the relative dielectric constants.

FIG. 15 is a table for describing one example of dielectric materials made of PVB and alumina. The table shown in FIG. 15 shows a relationship between the ratio of the volume of alumina and the relative dielectric constant of the dielectric materials when the dielectric materials are formed by adding alumina, which is a filler, to PVB. In the example shown in FIG. 15, the relative dielectric constant of each dielectric material is calculated, assuming that the relative dielectric constant of PVB is 2.7 and the relative dielectric constant of alumina is 10. Note that the relative dielectric constant of alumina and relative dielectric constants of dielectric materials 1 to 5 that will be described later are those at 79 GHz.

As shown in the table in FIG. 15, as the ratio of the volume of alumina in PVB increases, the relative dielectric constant of the dielectric material increases. Specifically, in the dielectric material 1, the ratio of the volume of alumina is 0.07 and the relative dielectric constant is 3.24. In the dielectric material 2, the ratio of the volume of alumina is 0.11 and the relative dielectric constant is 3.51. In the dielectric material 3, the ratio of the volume of alumina is 0.14 and the relative dielectric constant is 3.7. In the dielectric material 4, the ratio of the volume of alumina is 0.27 and the relative dielectric constant is 4.7. In the dielectric material 5, the ratio of the volume of alumina is 0.41 and the relative dielectric constant is 5.7.

As described above, in the present invention, by adding a filler to a material such as PVB, dielectric materials having desired relative dielectric constants can be obtained. These dielectric materials can be used as the interlayer films 13_1 to 13_3 of the laminated glass plates 1_1 to 1_3 described in the aforementioned first to third embodiments.

Next, another configuration example of the present invention will be described. FIGS. 16A to 16D are cross-sectional views showing another configuration example of the laminated glass according to the present invention. Each of laminated glass plates shown in FIGS. 16A to 16D also includes a first glass plate 11, a second glass plate 12, and interlayer films 50_1 to 50_3 held between the first glass plate 11 and the second glass plate 12.

Figure 16A:
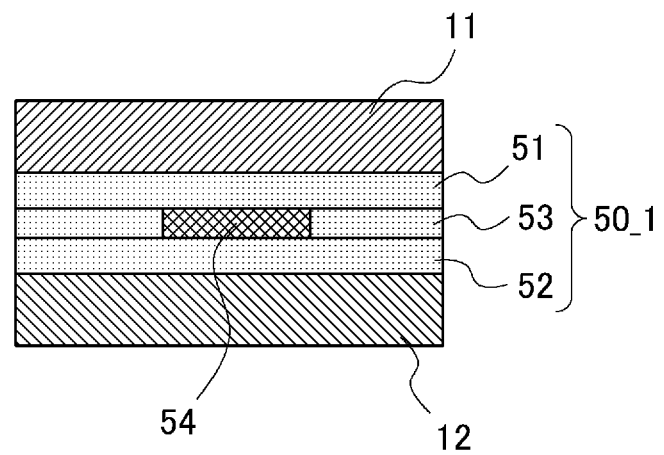
FIGS. 16A to 16D are cross-sectional views showing another configuration example of the laminated glass according to the present invention.

The interlayer film 50_1 of the laminated glass shown in FIG. 16A includes a first layer 51, a second layer 52, and a third layer 53. Then, a high dielectric constant layer 54 is provided in a part of the third layer 53. With this configuration, the radio wave transmittance of millimeter waves in a part (first region) where the high dielectric constant layer 54 is provided in a plan view of the glass plate 11 can be partially increased.

Figure 16B:
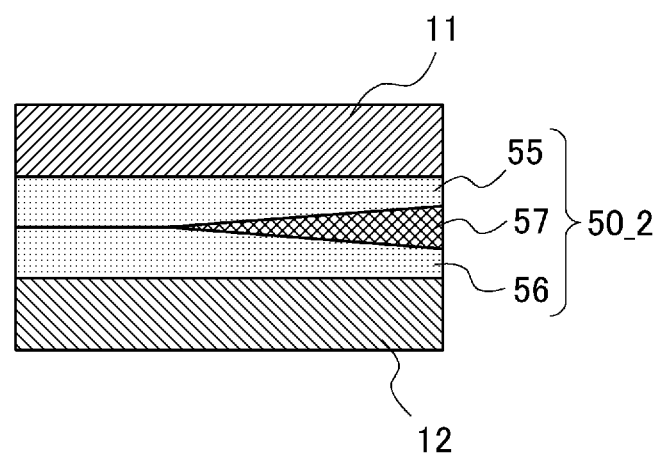

The interlayer film 50_2 of the laminated glass shown in FIG. 16B includes a first layer 55 and a second layer 56. Then, a high dielectric constant layer 57 is interposed between the first layer 55 and the second layer 56. For example, at the time of manufacturing, the high dielectric constant layer 57 is interposed in the interlayer film 50_2 from the end of the upper side (right side of FIG. 16B) of the windshield, then the interlayer film 50_2 is heated and compressed by an autoclave, whereby the radio wave transmittance of the millimeter waves on the upper side of the windshield can be partially increased. The high dielectric constant layer 57 is interposed in such a way that its thickness is gradually decreased as it is away from the end of the laminated glass.

Figure 16C:
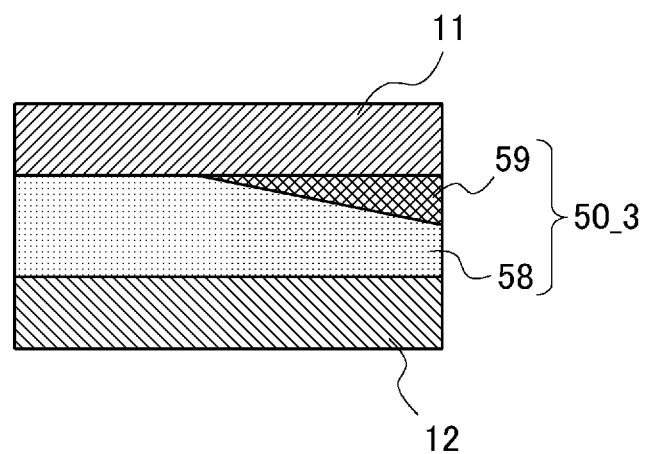

The interlayer film 50_3 of the laminated glass shown in FIG. 16C includes a first layer 58 and a second layer 59. The second layer 59, which is a high dielectric constant layer, is provided at an end of the interlayer film 50_3. In this case as well, for example, at the time of manufacturing, the second layer 59 (high dielectric constant layer) is interposed in the interlayer film 50_3 in such a manner that the second layer 59 is in contact with the first glass plate 11 from the end of the upper side (the right side of FIG. 16C) of the windshield, then the interlayer film 50_3 is heated and compressed by an autoclave, whereby the radio wave transmittance of the upper side of the windshield can be partially increased. Note that the high dielectric constant layer 59 is interposed in such a way that its thickness is gradually decreased as it is away from the end of the laminated glass.

Figure 16D:
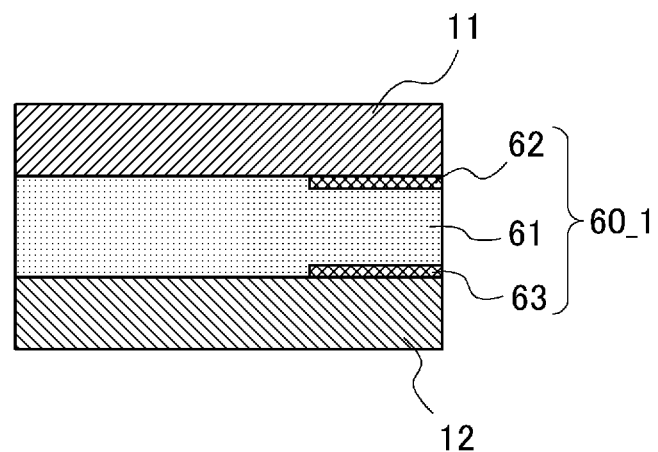

An interlayer film 60_1 of the laminated glass shown in FIG. 16D includes a dielectric layer 61 and high dielectric constant layers 62 and 63. The high dielectric constant layer 62 is provided between the dielectric layer 61 and the first glass plate 11 and the high dielectric constant layer 63 is provided between the dielectric layer 61 and the second glass plate 12. For example, the high dielectric constant layers 62 and 63 can be formed using a coated film having a high dielectric constant. For example, at the time of manufacturing, the high dielectric constant layers 62 and 63 are provided at the respective ends of the upper side (right side of FIG. 16D) of the windshield in such a way that they are in contact with the first glass plate 11 and the second glass plate 12 and the interlayer film 60_1 is heated and compressed by an autoclave, whereby the radio wave transmittance of the upper side of the windshield can be partially increased.

Another configuration example of the present invention will be further described. FIGS. 17A to 17E, which are cross-sectional views showing another configuration example of the laminated glass according to the present invention, show another configuration example in which only interlayer films are extracted.

Figure 17A:
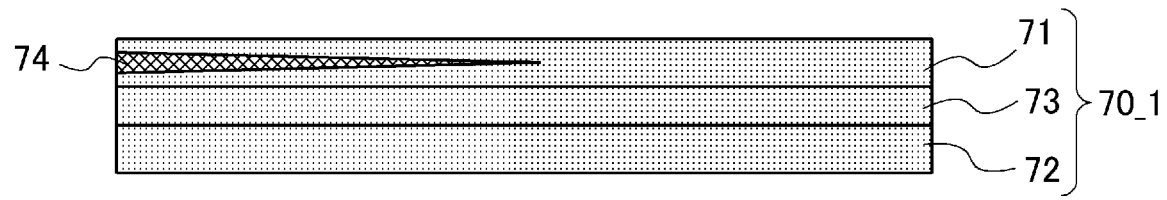
FIGS. 17A to 17E are cross-sectional views showing another configuration example of a laminated glass (interlayer film) according to the present invention.

An interlayer film 70_1 shown in FIG. 17A includes a first layer 71, a second layer 72, and a third layer 73. Then, a high dielectric constant layer 74 is interposed in a part of the first layer 71. By interposing the high dielectric constant layer 74, the radio wave transmittance of the laminated glass can be partially increased. Note that the high dielectric constant layer 74 is interposed in such a way that its thickness is gradually decreased as it is away from the end of the interlayer film 70_1 (laminated glass).

Figure 17B:
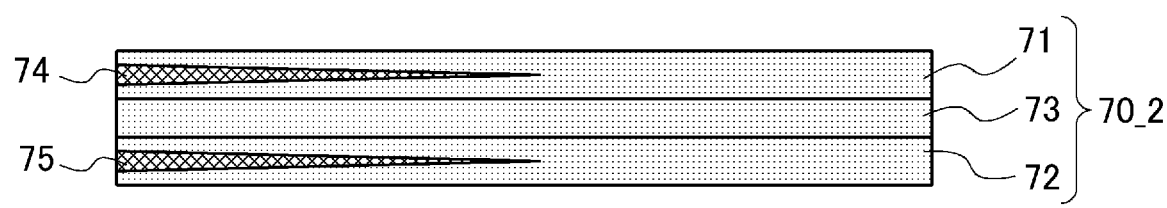

An interlayer film 70_2 shown in FIG. 17B includes a first layer 71, a second layer 72, and a third layer 73. Then, high dielectric constant layers 74 and 75 are respectively interposed in a part of the first layer 71 and a part of the second layer 72. By interposing the high dielectric constant layers 74 and 75, the radio wave transmittance of the laminated glass can be partially increased. The high dielectric constant layers 74 and 75 are interposed in such a way that its thicknesses are gradually decreased as they are away from the end of the interlayer film 70_2 (laminated glass).

Figure 17C:
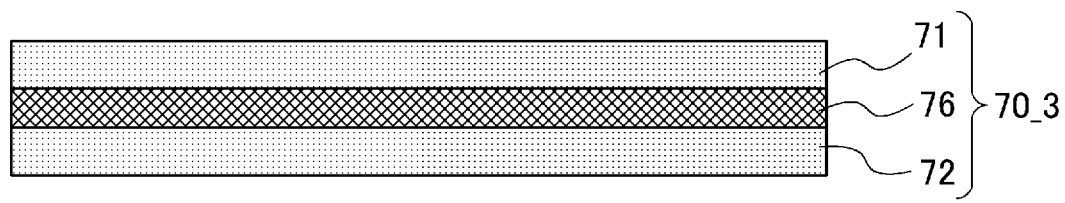

An interlayer film 70_3 shown in FIG. 17C includes a first layer 71, a second layer 72, and a third layer 76. In the configuration shown in FIG. 17C, the third layer 76 is a high dielectric constant layer and also serves as a core layer of the sound insulation film. Accordingly, the radio wave transmittance and the sound insulation properties of the laminated glass may be increased. Since the third layer 76 also serves as the core layer of the sound insulation film, the third layer 76 is made of a relatively soft material compared to those used for the first layer 71 and the second layer 72. In this case, each of the first layer 71 and the second layer 72 of the interlayer film 70_3 also serves as a skin layer, whereby the radio wave transmittance of the laminated glass with respect to millimeter waves may be increased and the sound insulation properties may be increased as well.

Figure 17D:
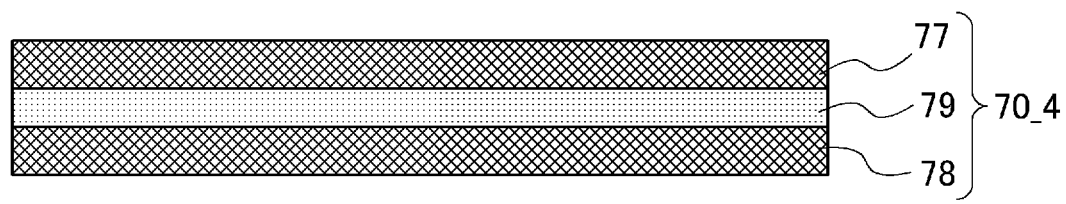

An interlayer film 70_4 shown in FIG. 17D includes a first layer 77, a second layer 78, and a third layer 79. In the configuration shown in FIG. 17D, each of the first layer 77 and the second layer 78 is a high dielectric constant layer and also serves as a skin layer of the sound insulation film. Accordingly, the radio wave transmittance and the sound insulation properties of the laminated glass may be increased. Since the first layer 77 and the second layer 78 also serve as skin layers of the sound insulation film, they are made of a relatively hard material compared to that used for the third layer 79. In this case, the third layer 79 of the interlayer film 70_4 also serves as a core layer. Therefore, the radio wave transmittance of the laminated glass with respect to the millimeter waves may be increased and the sound insulation properties may be increased as well.

Figure 17E:
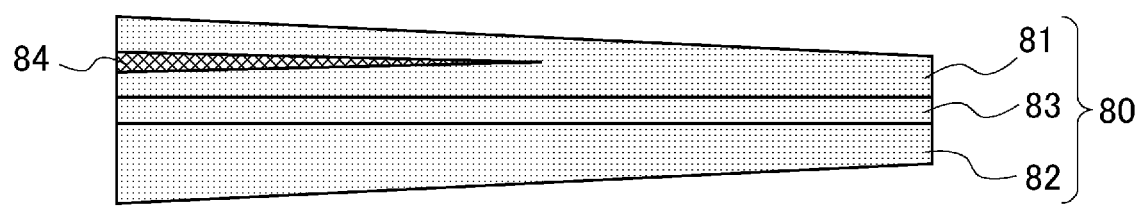

An interlayer film 80 shown in FIG. 17E includes a first layer 81, a second layer 82, and a third layer 83. The interlayer film 80 has a tapered shape so that the thickness of the interlayer film 80 decreases toward the right side. Specifically, the interlayer film 80 is formed in such a manner that the first layer 81 and the second layer 82 of the interlayer film 80 become thinner toward the right side. Further, a high dielectric constant layer 84 is provided in a part of the first layer 81. By interposing the high dielectric constant layer 84, the radio wave transmittance of the laminated glass can be partially increased. The interlayer film 80 shown in FIG. 17E can be used for a laminated glass (e.g., a head-up display) in which the first glass plate 11 and the second glass plate 12 are not parallel to each other. Note that the high dielectric constant layer 84 is provided in such a way that its thickness is gradually decreased as it is away from an end of the interlayer film 80 (laminated glass).

While the present invention has been described in view of the aforementioned embodiments, the present invention is not limited to the configurations of the aforementioned embodiments, and it is needless to say that the present invention includes various changes, modifications, and combinations that may be made by one skilled in the art within the claims of the present application.

What is claimed is:

1. A laminated glass comprising:
a first glass plate;
a second glass plate; and
an interlayer film held between the first glass plate and the second glass plate, wherein
the interlayer film includes, in a plan view of the first glass plate, a laminated region including a first layer that is in contact with the first glass plate, a second layer that is in contact with the second glass plate, and a third layer disposed between the first layer and the second layer, and
when a predetermined frequency in 60 to 100 GHz is expressed by F[GHz], and
when the relative dielectric constant of the first glass plate in the frequency F is denoted by $\varepsilon_{g1}$, the relative dielectric constant of the second glass plate in the frequency F is denoted by $\varepsilon_{g2}$, the relative dielectric constant of the first layer in the frequency F is denoted by $\varepsilon_{m1}$, the relative dielectric constant of the second layer in the frequency F is denoted by $\varepsilon_{m2}$, and the relative dielectric constant of the third layer in the frequency F is denoted by $\varepsilon_{m3}$, relationships $\varepsilon_{m1} < \varepsilon_{g1}, \varepsilon_{m1} < \varepsilon_{g2}$, $\varepsilon_{m2} < \varepsilon_{g1}, \varepsilon_{m2} < \varepsilon_{g2}$, and $\varepsilon_{m3} > \varepsilon_{m1}, \varepsilon_{m3} > \varepsilon_{m2}$ are established.

2. The laminated glass according to claim 1, wherein the $\varepsilon_{g1}$, the $\varepsilon_{g2}$, and the $\varepsilon_{m3}$ have relationships $\varepsilon_{m3} < \varepsilon_{g1}$ and $\varepsilon_{m3} < \varepsilon_{g2}$.

3. The laminated glass according to claim 1, wherein the $\varepsilon_{m1}$, the $\varepsilon_{m2}$, and the $\varepsilon_{m3}$ satisfy $\varepsilon_{m3}/\varepsilon_{m1} \geq 1.2$ and $\varepsilon_{m3}/\varepsilon_{m2} \geq 1.2$.

4. The laminated glass according to claim 1, wherein, when the thickness of the interlayer film is denoted by T and the thickness of the third layer is denoted by $T_{m3}$, $T_{m3}/T \geq 0.1$ is satisfied.

5. The laminated glass according to claim 1, wherein the $\varepsilon_{m1}$, the $\varepsilon_{m2}$, and the $\varepsilon_{m3}$ satisfy $\varepsilon_{m3}/\varepsilon_{m1} \geq 1.37$ and $\varepsilon_{m3}/\varepsilon_{m2} \geq 1.37$.

6. The laminated glass according to claim 5, wherein the $\varepsilon_{m1}$, the $\varepsilon_{m2}$, and the $\varepsilon_{m3}$ satisfy $2.11 \geq \varepsilon_{m3}/\varepsilon_{m1}$ and $2.11 \geq \varepsilon_{m3}/\varepsilon_{m2}$.

7. The laminated glass according to claim 1, wherein, when the thickness of the interlayer film is denoted by T and the thickness of the third layer is denoted by $T_{m3}$, $0.39 \leq T_{m3}/T < 1$ is satisfied.

8. The laminated glass according to claim 1, wherein
the interlayer film includes, in a plan view of the first glass plate,
a first region, which is the laminated region, and
a second region where the interlayer film is formed of only at least one of the first layer and the second layer.

9. The laminated glass according to claim 1, wherein the frequency F is 79 GHz.

10. The laminated glass according to claim 1, wherein one of the layers that compose the interlayer film that has a high relative dielectric constant is formed by mixing a filler having a high dielectric constant with a resin material.

11. A laminated glass comprising:
a first glass plate;
a second glass plate; and
an interlayer film held between the first glass plate and the second glass plate, wherein
the interlayer film includes, in a plan view of the first glass plate, a laminated region including a first layer that is in contact with the first glass plate, a second layer that is in contact with the second glass plate, and a third layer disposed between the first layer and the second layer, wherein when a predetermined frequency in 60 to 100 GHz is expressed by F[GHz], and when the relative dielectric constant of the first layer in the frequency F is denoted by $\varepsilon_{m1}$, the relative dielectric constant of the second layer in the frequency F is denoted by $\varepsilon_{m2}$, and the relative dielectric constant of the third layer in the frequency F is denoted by $\varepsilon_{m3}$, relationships $\varepsilon_{m1} > \varepsilon_{m3}$, and $\varepsilon_{m2} > \varepsilon_{m3}$ are established, and when the thickness of the interlayer film in the laminated region is denoted by T, the thickness of the first layer in the laminated region is denoted by $T_{m1}$, and the thickness of the second layer in the laminated region is denoted by $T_{m2}$, a relationship $(T_{m1}+T_{m2})/T \geq 0.5$ is established.

12. The laminated glass according to claim 11, wherein, when the relative dielectric constant of the first glass plate in the frequency F is denoted by $\varepsilon_{g1}$ and the relative dielectric constant of the second glass plate in the frequency F is denoted by $\varepsilon_{g2}$, the $\varepsilon_{g1}$, the $\varepsilon_{g2}$, the $\varepsilon_{m1}$, and the $\varepsilon_{m2}$ have relationships of $\varepsilon_{m1} < \varepsilon_{g1}$, $\varepsilon_{m1} < \varepsilon_{g2}$ and $\varepsilon_{m2} < \varepsilon_{g1}$, $\varepsilon_{m2} < \varepsilon_{g2}$.

13. The laminated glass according to claim 11, wherein the $\varepsilon_{m1}$, the $\varepsilon_{m2}$, and the $\varepsilon_{m3}$ satisfy $\varepsilon_{m1}/\varepsilon_{m3} \geq 1.2$ and $\varepsilon_{m2}/\varepsilon_{m3} \geq 1.2$.

14. The laminated glass according to claim 11, wherein the $\varepsilon_{m1}$, the $\varepsilon_{m2}$, and the $\varepsilon_{m3}$ satisfy $\varepsilon_{m1}/\varepsilon_{m3} \geq 1.37$ and $\varepsilon_{m2}/\varepsilon_{m3} \geq 1.37$.

15. The laminated glass according to claim 14, wherein the $\varepsilon_{m1}$, the $\varepsilon_{m2}$, and the $\varepsilon_{m3}$ satisfy $2.11 \geq \varepsilon_{m1}/\varepsilon_{m3}$ and $2.11 \geq \varepsilon_{m2}/\varepsilon_{m3}$.

16. The laminated glass according to claim 11, wherein the thickness T of the interlayer film, the thickness $T_{m1}$ of the first layer, and the thickness $T_{m2}$ of the second layer satisfy $0.66 \leq (T_{m1}+T_{m2})/T < 1$.

17. A laminated glass comprising:
a first glass plate;
a second glass plate; and
an interlayer film held between the first glass plate and the second glass plate, wherein
the interlayer film includes, in a plan view of the first glass plate, a laminated region including a first layer that is in contact with the first glass plate and a second layer that is in contact with the second glass plate,
when a predetermined frequency in 60 to 100 GHz is expressed by F[GHz], and
when the relative dielectric constant of the first glass plate in the frequency F is denoted by $\varepsilon_{g1}$, the relative dielectric constant of the second glass plate in the frequency F is denoted by $\varepsilon_{g2}$, the relative dielectric constant of one of the first layer and the second layer that has a relatively higher dielectric constant is denoted by $\varepsilon_{mH}$, and the relative dielectric constant of the other one of the first layer and the second layer that has a relatively lower dielectric constant is denoted by $\varepsilon_{mL}$, relationships $\varepsilon_{mH} < \varepsilon_{g1}$, $\varepsilon_{mH} < \varepsilon_{g2}$, $\varepsilon_{mL} < \varepsilon_{g1}$, $\varepsilon_{mL} < \varepsilon_{g2}$, are established, and
when the thickness of the interlayer film in the laminated region is denoted by T, and the thickness of one of the first layer and the second layer that has a relatively higher dielectric constant is denoted by $T_{mH}$, a relationship $T_{mH}/T \geq 0.3$ is established.

18. The laminated glass according to claim 17, wherein the $\varepsilon_{mH}$ and the $\varepsilon_{mL}$ satisfy $\varepsilon_{mH}/\varepsilon_{mL} \geq 1.2$.

19. The laminated glass according to claim 17, wherein the $\varepsilon_{mH}$ and the $\varepsilon_{mL}$ satisfy $\varepsilon_{mH}/\varepsilon_{mL} \geq 1.37$.

20. The laminated glass according to claim 17, wherein the T and the $T_{mH}$ satisfy $0.66 \leq T_{mH}/T < 1$.

* * * * *